(12) United States Patent
Hashimoto et al.

(10) Patent No.: US 11,477,342 B2
(45) Date of Patent: Oct. 18, 2022

(54) READING DEVICE, IMAGE FORMING APPARATUS, AND METHOD DETECTING AND CORRECTING READING-DEPTH CHANGE BASED BY READING IMAGE IN FIRST AND SECOND WAVELENGTH RANGE

(71) Applicants: Hideki Hashimoto, Tokyo (JP);
Masamoto Nakazawa, Kanagawa (JP);
Daisuke Nikaku, Kanagawa (JP);
Yutaka Ohmiya, Tokyo (JP)

(72) Inventors: Hideki Hashimoto, Tokyo (JP);
Masamoto Nakazawa, Kanagawa (JP);
Daisuke Nikaku, Kanagawa (JP);
Yutaka Ohmiya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/489,869

(22) Filed: Sep. 30, 2021

(65) Prior Publication Data
US 2022/0109779 A1   Apr. 7, 2022

(30) Foreign Application Priority Data
Oct. 1, 2020   (JP) .............................. JP2020-167360

(51) Int. Cl.
*H04N 1/387* (2006.01)
*H04N 1/00* (2006.01)
(Continued)

(52) U.S. Cl.
CPC ......... *H04N 1/387* (2013.01); *H04N 1/00013* (2013.01); *H04N 1/00037* (2013.01);
(Continued)

(58) Field of Classification Search
None
See application file for complete search history.

(56) References Cited

U.S. PATENT DOCUMENTS 6,765,206 B2 * 7/2004 Sugiyama ............ H04N 1/4097
358/448
2010/0027061 A1   2/2010 Nakazawa
(Continued)

FOREIGN PATENT DOCUMENTS

JP  2008-311953 A   12/2008
JP  2011-193404       9/2011
(Continued)

OTHER PUBLICATIONS

Extended European Search Report dated Feb. 7, 2022 in European Patent Application No. 21199922.2, 10 pages.

*Primary Examiner* — Scott A Rogers
(74) *Attorney, Agent, or Firm* — Xsensus LLP

(57) ABSTRACT

A reading device, an image forming apparatus, and a method of correction. The reading device includes a scanner configured to read an image in a first wavelength range and an image in a second wavelength range from light reflected by a surface of a recording medium, a detector configured to detect a change from a reference position in a reading-depth direction when the surface of the recording medium is read by the scanner, based on an amount of characteristic read from the image in the second wavelength range, and a corrector configured to correct the image in the first wavelength range based on the change detected by the detector. The image forming apparatus includes the reading device, and an image forming device configured to form an image corrected by the corrector of the reading device on a recording medium. The method includes reading the image in the first wavelength.

15 Claims, 31 Drawing Sheets

(51) Int. Cl.
*H04N 1/60* (2006.01)
*H04N 1/40* (2006.01)

(52) U.S. Cl.
CPC ..... *H04N 1/00045* (2013.01); *H04N 1/00724* (2013.01); *H04N 1/40068* (2013.01); *H04N 1/603* (2013.01)

(56) References Cited

U.S. PATENT DOCUMENTS

| | | |
|---|---|---|
| 2017/0295298 A1 | 10/2017 | Ozaki et al. |
| 2018/0146150 A1 | 5/2018 | Shirado et al. |
| 2019/0199875 A1 | 6/2019 | Komatsu |
| 2019/0327387 A1 | 10/2019 | Hashimoto et al. |
| 2020/0053230 A1 | 2/2020 | Nakazawa et al. |
| 2020/0106918 A1* | 4/2020 | Nakamura ........... H04N 1/3873 |
| 2020/0106919 A1* | 4/2020 | Nakamura ......... H04N 1/00718 |
| 2020/0120228 A1 | 4/2020 | Ozaki et al. |
| 2021/0014441 A1 | 1/2021 | Ohmiya et al. |
| 2021/0409566 A1* | 12/2021 | Hashimoto ........ H04N 1/00037 |

FOREIGN PATENT DOCUMENTS

| | | |
|---|---|---|
| JP | 2012-129924 | 7/2012 |
| JP | 2012129924 A * | 7/2012 |
| JP | 2021-022885 | 2/2021 |

* cited by examiner

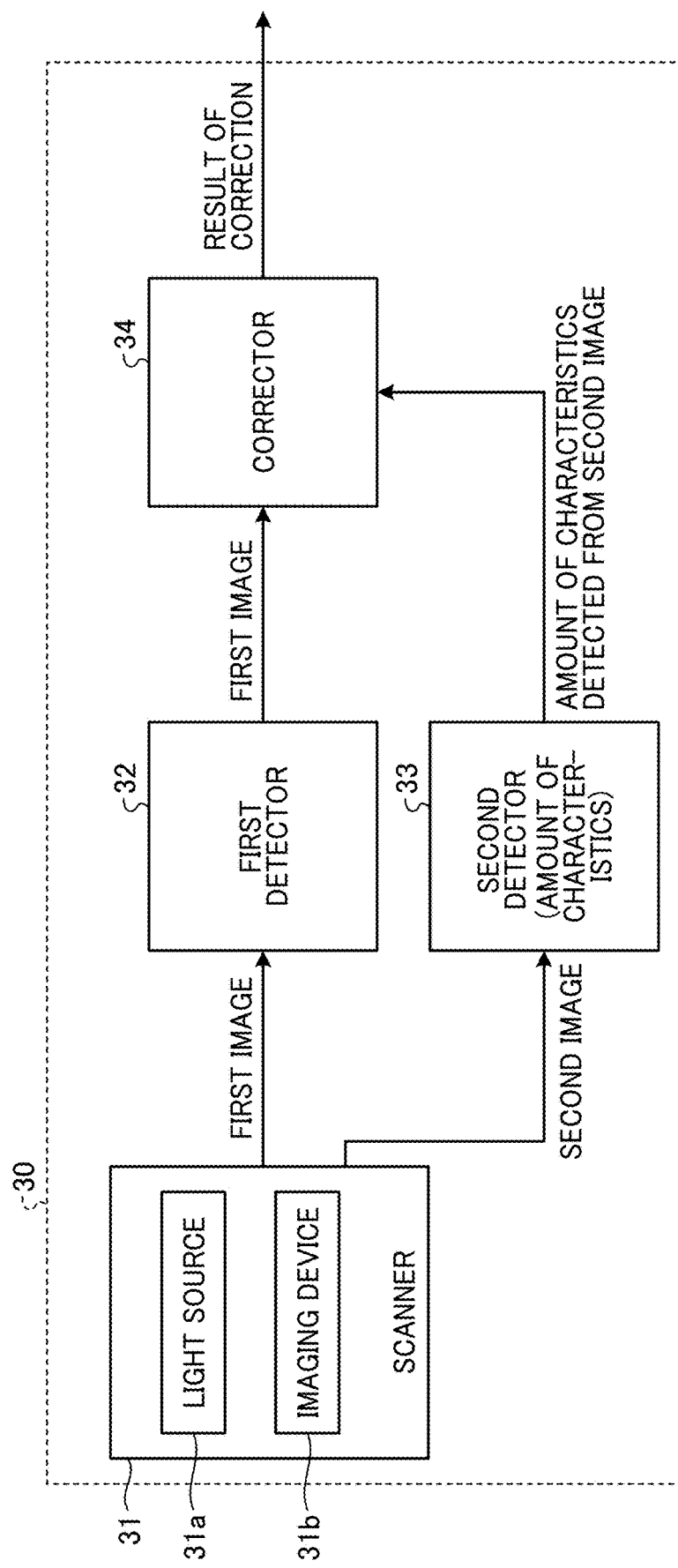

MAIN SCANNING DIRECTION (a) WHEN PASSING THROUGH REFERENCE POSITION (b) WHEN CLOSER BY 2mm

INVISIBLE FOR HUMAN EYE

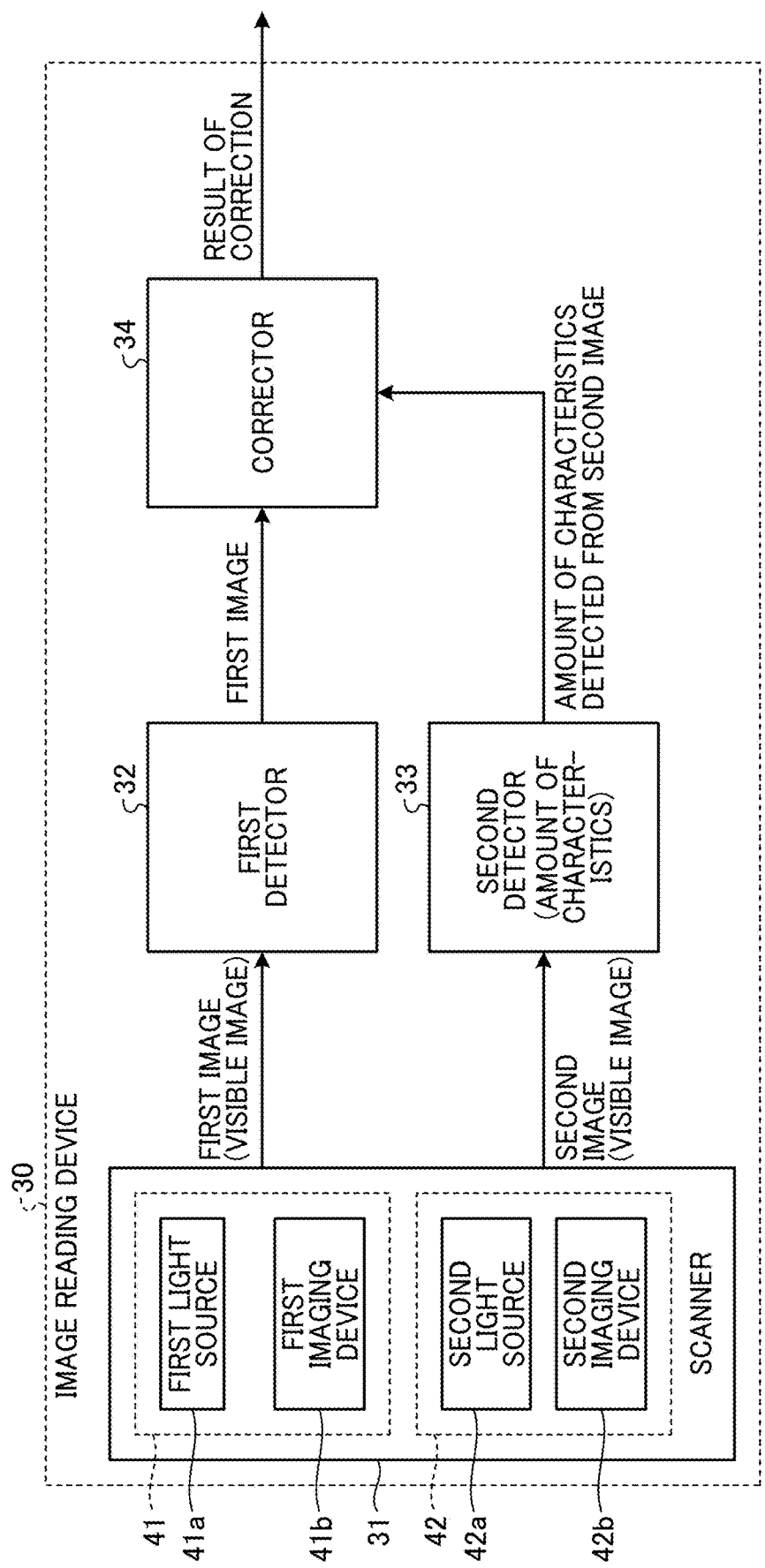

FIG. 20

| NUMBER OF PIXELS WHOSE COLOR CHANGES FROM BLACK TO WHITE | MTF (%) |
|---|---|
| 2 | 70 |
| 3 | 60 |
| 4 | 50 |
| 5 | 45 |
| 6 | 40 |
| 7 | 35 |
| 8 | 30 |

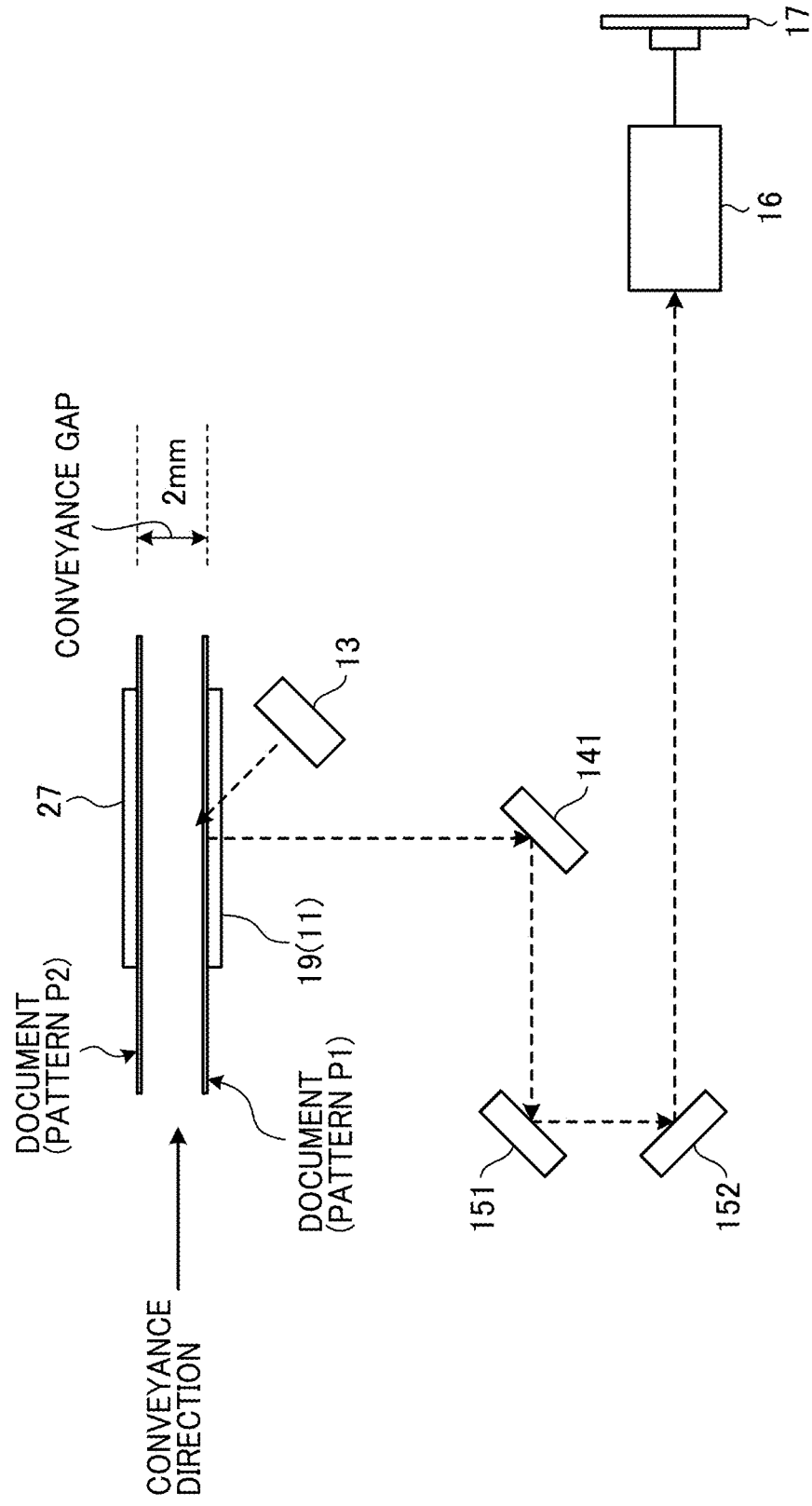

FIG. 27

| PAPER TYPE | SCANNING LEVEL@GAP 0 MM (OBTAINED IN ADVANCE) | SCANNING LEVEL | CHANGES IN ILLUMINANCE | CHANGES IN READING DEPTH |
|---|---|---|---|---|
| A | 220digit/8bit | 198digit/8bit | -10% | 2mm |
| B | 200digit/8bit | 200digit/8bit | 0% | 0mm |
| C | 210digit/8bit | 202digit/8bit | -4% | 1mm |
| D | 230digit/8bit | 214digit/8bit | -7% | 1.5mm |
| E | 204digit/8bit | 235digit/8bit | -2% | 0.5mm |

READING DEVICE, IMAGE FORMING APPARATUS, AND METHOD DETECTING AND CORRECTING READING-DEPTH CHANGE BASED BY READING IMAGE IN FIRST AND SECOND WAVELENGTH RANGE

CROSS-REFERENCE TO RELATED APPLICATION

This patent application is based on and claims priority pursuant to 35 U.S.C. § 119(a) to Japanese Patent Application No. 2020-167360, filed on Oct. 1, 2020, in the Japan Patent Office, the entire disclosure of which is hereby incorporated by reference herein.

BACKGROUND

Technical Field

Embodiments of the present disclosure relate to a reading device, an image forming apparatus, and a correction method.

Background Art

In the related art, when an object to be read is read by an image reading device, the object to be read may change in the reading-depth direction at the scanning position, and the read value may vary according to the variations in the reading-depth direction. For example, paper may flap when conveyed, and the object to be read of the paper may change in the reading-depth direction at the scanning position. In order to correct such variations in read value, technologies to form a predetermined pattern on a backing of the object to be read are known in the art. Such a predetermined pattern is scanned and read, and the read value is corrected based on the read pattern.

For example, technologies to irradiate a sheet with infrared light when such a sheet is scanned and to detect the degree of transparency of the sheet based on the infrared light reflected from the backing of the sheet are known in the art. The read value is corrected based on the detected degree of transparency of the sheet.

SUMMARY

Embodiments of the present disclosure described herein provide a reading device, an image forming apparatus, and a method of correction. The reading device includes a scanner configured to read an image in a first wavelength range and an image in a second wavelength range from light reflected by a surface of a recording medium, a detector configured to detect a change from a reference position in a reading-depth direction when the surface of the recording medium is read by the scanner, based on an amount of characteristic read from the image in the second wavelength range, and a corrector configured to correct the image in the first wavelength range based on the change detected by the detector. The image forming apparatus includes the reading device, and an image forming device configured to form an image corrected by the corrector of the reading device on a recording medium. The method includes reading the image in the first wavelength and the image in the second wavelength range from light reflected by the surface of the recording medium, detecting the change from the reference position in the reading-depth direction when the surface of the recording medium is read by the reading, based on the amount of characteristic read from the image in the second wavelength range, and correcting the image in the first wavelength range based on the change detected by the detecting.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 4 is a diagram illustrating a configuration of a reading system and a correction unit of a reading device according to an embodiment of the present disclosure.

FIG. 15 is a diagram illustrating a configuration of a reading system and a correction unit of a reading device according to a third modification of the above embodiments of the present disclosure.

FIG. 20 is a diagram illustrating a setting table according to the fifth modification of the above embodiments of the present disclosure.

FIG. 25 is a diagram illustrating a conveyance pattern according to an embodiment of the present disclosure.

FIG. 27 is a diagram illustrating the changes in reading depth as the illuminance of a light source changes, according to an embodiment of the present disclosure.

Figure 1:
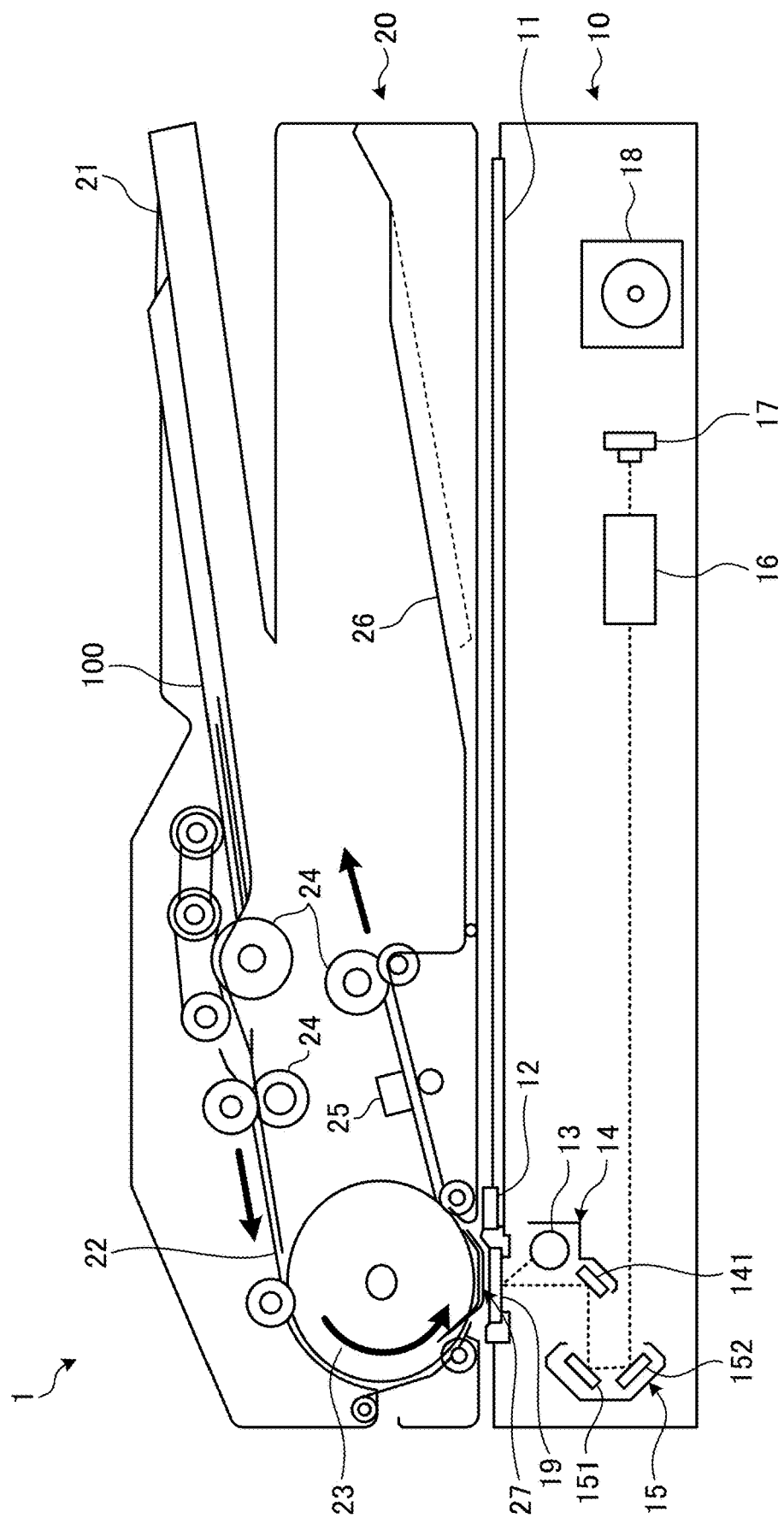
FIG. 1 is a diagram illustrating a reading device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A reading device, an image forming apparatus, and a correction method according to an embodiment of the present disclosure is described below in detail with reference to the accompanying drawings.

First Embodiment

FIG. 1 is a diagram illustrating a reading device according to the first embodiment.

FIG. 1 illustrates a configuration of a document reading device 1 equipped with an automatic document feeder (ADF) 20 that serves as a reading device, according to the present embodiment.

A reading device main body 10 has a contact glass 11 on a top face, and includes, for example, a light source 13, a first carriage 14, a second carriage 15, a lens unit 16, a sensor board 17 inside the reading device main body 10 that together serve as a scanner for a reduction optical system. In FIG. 1, the first carriage 14 includes the light source 13 and a reflection mirror 141, and the second carriage 15 includes mirrors 151 and 152. Such a configuration of the reduction optical system is given by way of example, and no limitation is intended thereby.

An object to be read is irradiated with the light that is emitted from the light source 13, and the light reflected by the object to be read is reflected by the mirror 141 of the first carriage 14 or the mirrors 151 and 152 of the second carriage 15. Then, the reflected light is incident on the lens unit 16, and the image of the object to be read is formed on the photo-sensing surface of the sensor board 17 in a reduced size. The sensor board 17 includes a line sensor such as a charge coupled device (CCD) or a complementary metal oxide semiconductor (CMOS), and sequentially converts the image of an object to be read formed on the photo-sensing surface of the line sensor into an electrical signal. In the present embodiment, the sensor board 17 includes a plurality of line sensors, and each line sensor receives light in a different wavelength region and converts the received light into an electrical signal. A reference white board 12 is used to correct, for example, the changes in radiation intensity of light of the light source 13 or the variations in the pixel array of the line sensor.

The document reading device 1 is provided with a control board on the reading device main body 10, and controls each element of the reading device main body 10 and each element on the ADF 20 to perform scanning on a document 100 with a predetermined scanning method.

For example, the document reading device 1 uses the ADF 20 to perform scanning of sheet-through type on the document 100. When scanning of the sheet-through type is performed, the document reading device 1 conveys the document 100 of a bundle of documents on a one-by-one basis from the feed tray 21 of the ADF 20 along the conveyance path 22 of the ADF 20, and reads the surface of the document 100 to be read, which is being conveyed along the conveyance path 22, at a predetermined scanning position. Finally, the document 100 is ejected to an output tray 26. The document 100 is conveyed along the conveyance path 22 by the rotation of a conveying drum 23 and various kinds of conveyance rollers 24.

In the document reading device 1, for example, the first carriage 14 and the second carriage 15 are moved to a predetermined home position and fixed thereto, and the document 100 is scanned and obtained when the document 100 passes through the scanning window 19. The scanning window 19 is a slit-shaped scanning window formed on a part of the contact glass 11, and the document 100 is scanned in the sub-scanning direction as the document 100 is automatically conveyed and passes through the scanning window 19. While the document 100 is passing through the scanning window 19, the document reading device 1 uses the multiple line sensors on the sensor board 17 to sequentially read the light that is emitted from the light source 13 and then reflected by the first face of the document 100 facing the scanning window 19. The first face of the document 100 may be the front side or the rear side of the document.

When both sides of the document 100 are to be scanned the document reading device 1 uses the reading device 25 to scan the rear side of the document 100 after the document has passed through the scanning window 19. The reading device 25 is provided with a scanner of unity magnification.

In the configuration of the document reading device 1 according to the present embodiment, flatbed scanning can also be performed. More specifically, the ADF 20 is lifted to expose the contact glass 11, and the document 100 is directly disposed on the contact glass 11. Then, the ADF 20 is lowered to the original position, and the rear side of the document 100 is pressed and held by the lower side of the ADF 20. In the flatbed scanning, as the document 100 is fixed, the first carriage 14 and the second carriage 15 are moved relative to the document 100 to scan the document. The first carriage 14 and the second carriage 15 are driven by a scanner motor 18 to scan the document 100 in the sub-scanning direction. For example, the first carriage 14 moves at a speed V, and the second carriage 15 moves at a speed ½V which is half the speed of the first carriage 14 in conjunction with the movement of the first carriage 14. By so doing, the first face of the document 100 on the contact glass 11 side is scanned.

In the present embodiment, for example, the first carriage 14, the second carriage 15, the lens unit 16, and the sensor board 17 are separately illustrated, but these elements may be individually provided or may be provided as an integrated sensor module.

Next, a configuration in which a result of scanning that varies depending on a condition of the document 100 during the scanning process is corrected is described. For example, when the document 100 is conveyed, the document 100 may flap, and a gap occurs in the height of the document 100 when passing through the scanning position. Such flapping of the document may be referred to as conveyance flapping in the following description, and such a gap may be referred to as a conveyance gap in the following description. For example, at a scanning position where scanning of sheet-through type is performed, a conveyance gap occurs due to the conveyance. The occurrence of such a gap is not limited to the cases in which the document 100 is conveyed and scanned, but such a gap may occur according to the scanning position. The changes in read value depending on the height of the document 100 is described below with reference to schematic diagrams, in view of a conveyance gap during the conveyance.

Figure 2:
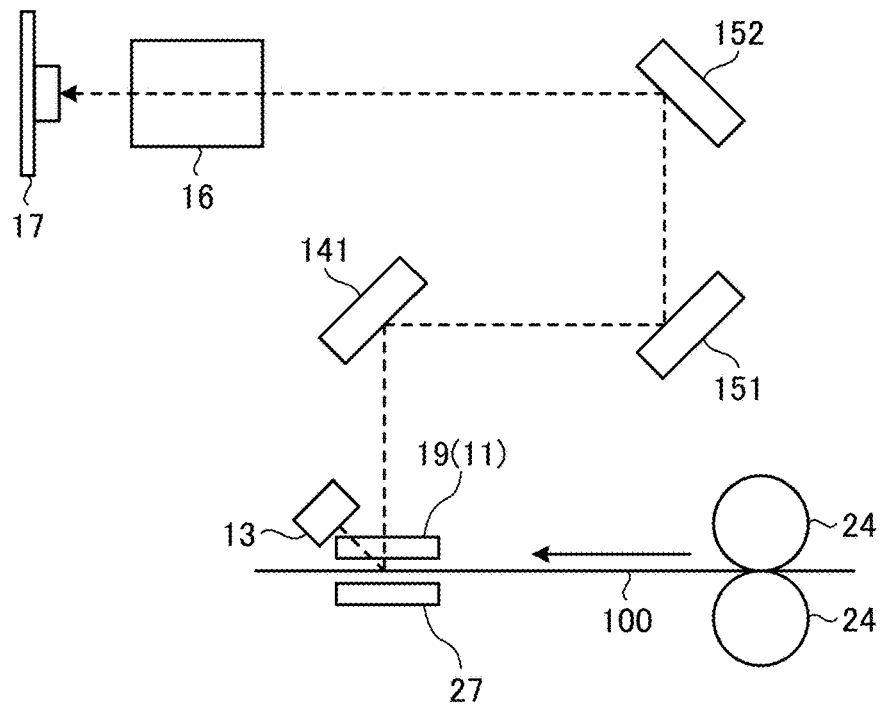
FIG. 2 is a schematic diagram illustrating a configuration of scanning position and a configuration of a scanner, according to an embodiment of the present disclosure.
Figure 3:
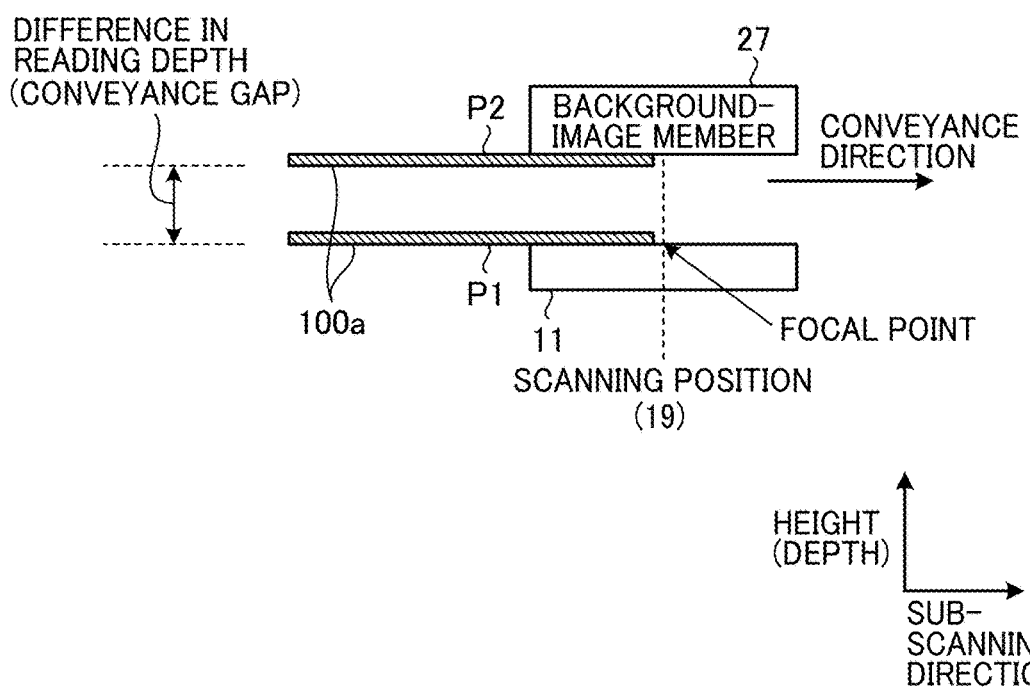
FIG. 3 is a diagram illustrating a conveyance pattern of a document at a scanning position, according to an embodiment of the present disclosure.

FIG. 2 and FIG. 3 are diagrams illustrating a conveyance pattern at the scanning position of the document 100, according to the present embodiment.

FIG. 2 is a schematic diagram illustrating a configuration of scanning position and a configuration of a scanner, according to the present embodiment.

FIG. 3 is a diagram illustrating a conveyance pattern of the document 100 at the scanning position, according to the present embodiment.

As illustrated in FIG. 2, the document 100 is conveyed by various kinds of conveyance rollers 24 and passes through a gap between the scanning position of the contact glass 11 and a background-image member 27. In the configuration of the document reading device 1 according to the present embodiment, the scanning position exists above the scanning window 19. The background-image member 27 corresponds to a member arranged on the rear side of the document 100 at the scanning position. In the configuration of the document reading device 1 according to the present embodiment, the conveying drum 23 (see FIG. 1) is arranged to face the scanning window 19. Due to such a configuration, the surface of the conveying drum 23 also serves as the background-image member 27.

In a similar manner to FIG. 1, a reduction optical system is adopted, and while the document 100 passes through the scanning window 19, an image is formed on the line sensors on the sensor board 17 in a reduced sire with the light that is emitted from the light source 13 and then is reflected by the first face of the document 100 facing the scanning window 19 and travels along the path indicated by the dotted line in FIG. 2.

The document 100 has a flap due to, for example, the thickness of the document 100, and a conveyance gap occurs at the scanning position as illustrated in FIG. 3. In other words, the position through which a document surface 100a of the document 100 to be read passes at the scanning position changes in the reading-depth direction. For example, when the focal point is optimized at a position where the document passes as in a document pattern P1 as illustrated in FIG. 3, the resolution at the position of the document pattern P1 is high. However, when the document passes as in a document pattern P2, it is difficult to adjust the focus at the scanning position, and the resolution of the scanned image decreases. As a result, the obtained image tends to be blurred. In order to handle such a situation, in the present embodiment, the conveyance gap, i.e., the changes, in the reading-depth direction with reference to a reference position such as the focal point is detected from the detection pattern on the document surface 100a, and the read data of the document image of the document surface 100a is corrected according to the conveyance gap.

FIG. 4 is a diagram illustrating a configuration of a reading system and a correction unit of the reading device according to the present embodiment.

By way of example, the configuration or structure of the above reading system and correction unit of the document reading device 1 is described below.

The scanner 31 includes a light source 31a and an imaging device 31b. The light source 31a and the imaging device 31b are included in the reading system. The light source 31a corresponds to the light source 13, and the imaging device 31b corresponds to the first carriage 14, the second carriage 15, the lens unit 16, and the sensor board 17. However, no limitation is intended thereby, and the light source 31a and the imaging device 31b may have different configuration or structure.

The scanner 31 irradiates the document surface 100a with the light emitted from the light source 31a or the light source 13, and scans and reads the data of the document surface 100a detected by the imaging device 31b in the first wavelength range from the light reflected by the document surface 100a. The data of the document surface 100a may be referred to as a first image in the following description. Moreover, the scanner 31 scans and reads the detection pattern of the document surface 100a detected by the imaging device 31b in the second wavelength range from the light reflected by the document surface 100a. The detection pattern of the document surface 100a may be referred to as a second image in the following description.

In the present embodiment, the detection pattern on the document surface 100a may be formed by, for example, a coloring material detected in the second wavelength range of the imaging device 31b. As a result, the detection pattern on the document surface 100a can be distinguished from the document image.

Moreover, for example, the wavelength region to be used and a configuration or structure of the reading system is selected such that modulation transfer function (MTF) characteristics indicating image reading resolution are different between when the first image is read and when the second image is read. The first wavelength range, the second wavelength range, the configuration of the detection pattern, and the MTF characteristics are described later in detail.

The first detector 32, the second detector 33, and the corrector 34 serve as a correction unit that corrects the output from the imaging device 31b, i.e., the output from the sensor board 17. The first detector 32 and the second detector 33 in the present embodiment correspond to a detector. The correction unit is implemented on the control board by hardware such as an application-specific integrated circuit (ASIC), and receives and processes the read data of the first image and the second image output from the sensor board 17.

The first detector 32 detects and holds the first image read by the scanner 31.

The second detector 33 detects the variations in the reading-depth direction from the MTF value of the second image read by the scanner 31.

The corrector 34 corrects the first image according to the variations in the reading-depth direction detected based on the second image. The corrector 34 may be omitted depending on the intended use of read data. In the following description, it is assumed that the corrector 34 is given as a correction unit.

A correction method is described below in detail.

Figure 5A:
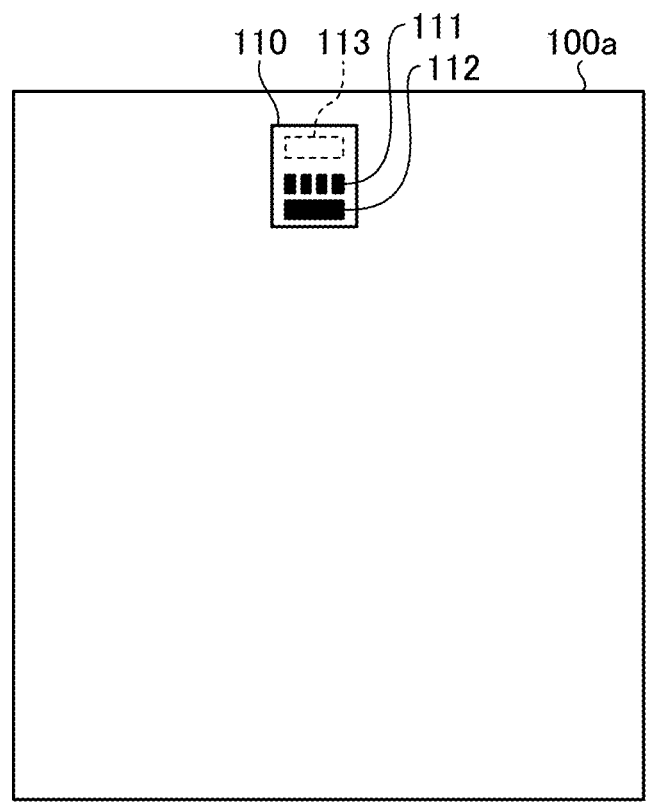
FIG. 5A and FIG. 5B are diagrams each illustrating a process of detecting a modulation transfer function (MTF) value, according to an embodiment of the present disclosure.
Figure 5B:
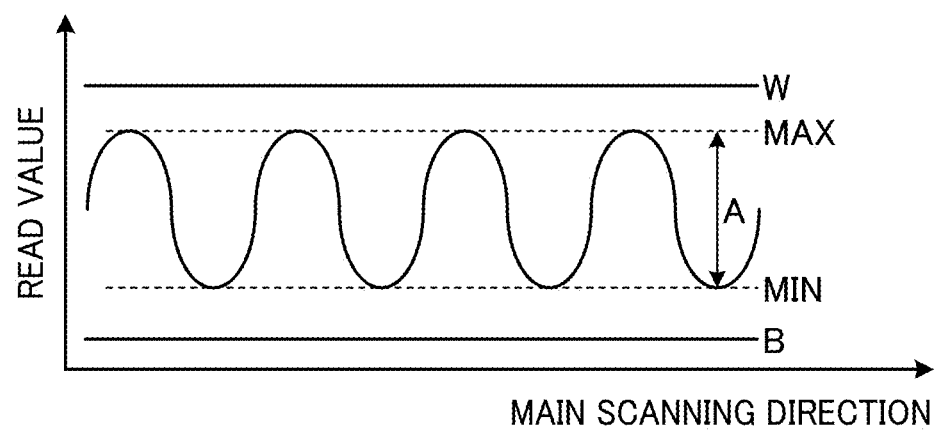

FIG. 5A and FIG. 5B are diagrams illustrating the processes of detecting an MTF value, according to the present embodiment.

More specifically, FIG. 5A illustrates a detection pattern arranged for the document surface 100a, and FIG. 5B illustrates a value read from the detection pattern.

As illustrated in FIG. 5A, a detection pattern 110 is arranged on the document surface 100a. When both sides are to be read, the detection pattern 110 may be arranged on both sides of the document 100. For example, the detection pattern 110 is formed by a coloring material to be detected by the imaging device 31b in the second wavelength range.

By way of example, FIG. 5A illustrates the detection pattern 110 when the bare surface of the document 100 is white.

The detection pattern 110 as illustrated in FIG. 5A includes vertical line patterns 111 in which, for example, four black vertical lines are arranged at equal intervals, and a black solid-fill portion 112 filled with black. The vertical line patterns 111 are arranged at equal intervals in the main scanning direction orthogonal to the conveying direction, i.e., the sub-scanning direction of the document 100.

In such a configuration, the document reading device 1 scans the images of a white blank portion 113, the vertical line patterns 111, and the black solid-fill portion 112 of the sheet of the document 100 to obtain a second image, and calculates an MTF value based on the obtained second image.

For example, when an area of infrared light is used as the second wavelength range, black ink or black toner is suitable. Black ink or toner has good absorptivity for light in infrared range, and when the detection pattern 110 of such light in infrared is read, an image having high contrast between a white blank portion and a black portion can be obtained as the second image. For this reason, black ink or toner is suitable for the detection of an MTF value.

For example, the reading system according to the present modification for the second image can be implemented with a configuration in which the detection pattern 110 is irradiated with infrared light and the reflected light is received by a line sensor having light-receptive sensitivity for the light in an infrared range. For the reading system of the first image, a coloring material that can be read by human eyes under visible light is used for the document image in the related art. Accordingly, for example, the detection pattern 110 may be irradiated with visible light, and the reflected light may be received by a line sensor having light-receptive sensitivity for the light in a visible range. The line sensor according to the present embodiment may be configured to read four colors of read (R), green (G), blue (B), and near infrared (NIR) simultaneously. Alternatively, four colors of read (R), green (G), blue (B), and near infrared (NIR) may be read by a plurality of separate line sensors.

The optical system of the light source 31a that is used to emit visible light and infrared light and the imaging device 31b that guides the light reflected by the document to the line sensor to form an image may be used in common between visible light and infrared light to reduce the size of the image forming apparatus. However, no limitation is indicated thereby, and the optical system of the light source 31a may be arranged differently from the optical system of the imaging device 31b as appropriate.

The wavelength range of the light source and the band of the light-receptive sensitivity of the line sensor according to the present embodiment are given by way of example, and no limitation is intended thereby. For example, the waveband range of the light source and the band of the light-receptive sensitivity of the line sensor may be changed and may be combined as desired.

FIG. 5B illustrates the relation among the read values of the white blank portion 113, the vertical line patterns 111, and the black solid-fill portion 112.

The horizontal axis represents the main scanning direction, and the vertical axis represents the read values. More specifically, the read values of each of the white blank portion 113, the vertical line pattern 111, and the black solid-fill portion 112 in the main scanning direction are depicted. In FIG. 5B, the read value of the white blank portion 113 corresponds to the predetermined value W, and the read value of the black solid-fill portion 112 corresponds to the predetermined value B. The vertical line pattern 111 alternately changes between the read value of MAX and the read value of MIN, and the difference between the read value of MAX and the read value of MIN is indicated by A. As the difference A changes in accordance with the reading depth in the document surface 100a, the MTF is expressed by the first equation given below using A as a variable.

$$MTF = A/(W-B) \times 100 (\%) \quad \text{First Equation}$$

In other words, the MTF value also changes according to the reading depth of the document surface 100a.

The above reading device reads the detection pattern 110 on the document surface 100a as a second image every time the document surface 100a is read, and calculates an MTF value from the second image. Then, the reading device calculates and obtains each time the reading depth corresponding to the MTF value of the read second image from the characteristics data obtained in advance when the second image is read by the same optical system. Such characteristics data indicates the relation between the MTF value and the reading depth and may be referred to as MTF characteristics data in the following description. Moreover, the variations from the reference position such as a focal point in the reading-depth direction of the document surface 100a is also obtained from the MTF characteristics data.

Figure 6:
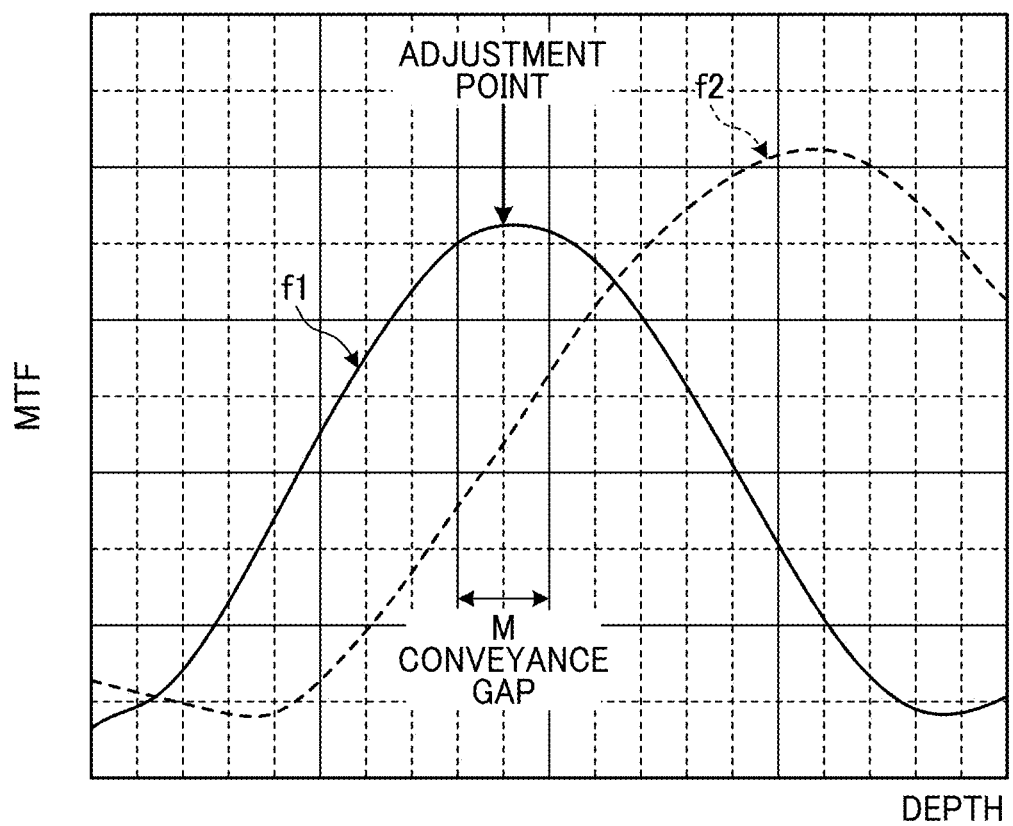
FIG. 6 is a diagram illustrating MTF characteristics in a reading system of the reading device according to the first embodiment of the present disclosure.

FIG. 6 is a diagram illustrating the MTF characteristics in a reading system of the above reading apparatus according to the first embodiment of the present disclosure.

In FIG. 6, the horizontal axis represents the reading depth, and the vertical axis represents the MTF value. In regard to the reading system of the reading device, the MTF characteristics f1, i.e., the first MTF characteristics indicated by a solid line, for the first image and the MTF characteristics f2, i.e., the second MTF characteristics indicated by a broken line, for the second image are depicted in an overlaid with manner.

The first MTF characteristics f1 indicates characteristics suitable for scanning an document image. Accordingly, the first MTF characteristics f1 are set so that the changes in MTF value becomes small within the maximum conveyance gap M which is the reading range in the reading-depth direction. A small change indicates a change that is not a steady change. In the present embodiment as illustrated in FIG. 6, the reading system is set so that the MTF value is maximized at the maximum conveyance gap M. For example, the focal point is adjusted to an intermediate point of the maximum conveyance gap M. By so doing, the out-of-focus of the first image read in the conveyance gap M is minimized, and the MTF can be prevented from decreasing.

On the other hand, the second MTF characteristics f2 is set so that the change of the MTF value becomes large according to the passing position in the maximum conveyance gap M. In the present embodiment, the MTF value is set so as to increase steadily at the maximum conveyance gap M. The setting is determined based on, for example, a coloring material to be used for the detection pattern on the document surface 100a, the selection of a band of the first waveband and the second waveband, and the selection of the reading system of each band. By so doing, the influence on the document image due to the variations in depth can be reduced to a minimum level, and the variations in the reading-depth direction of the document surface 100a can be accurately detected.

The same effect can be achieved even if the steady increase is changed to a steady change such as a steady decrease. Moreover, as the inclination of the second MTF characteristics f2 in the conveyance gap M is greater, the variations in the reading-depth direction of the document surface 100a can be detected more accurately.

In the present embodiment, the sensitive wavelengths of the optical system and the sensor are set to be the second MTF characteristics f2, and the second MTF characteristics f2 is stored in a memory or the like. Then, at the time of reading the document image, the detection pattern 110 is detected in the second wavelength range, and each value read from the detection pattern 110 is substituted into B value, A value, and W value of the first equation to calculate the MTF value. The calculated MTF value is compared with the second MTF characteristics f2 in the memory to calculate the reading depth.

FIG. 7A, FIG. 7B, FIG. 7C, FIG. 7D, and FIG. 8 are diagrams illustrating variations in reading depth depending on the document pattern, according to the present embodiment.

FIG. 7A, FIG. 7B, FIG. 7C, and FIG. 7D are diagrams illustrating a plurality of document patterns according to the present embodiment.

Figure 8:
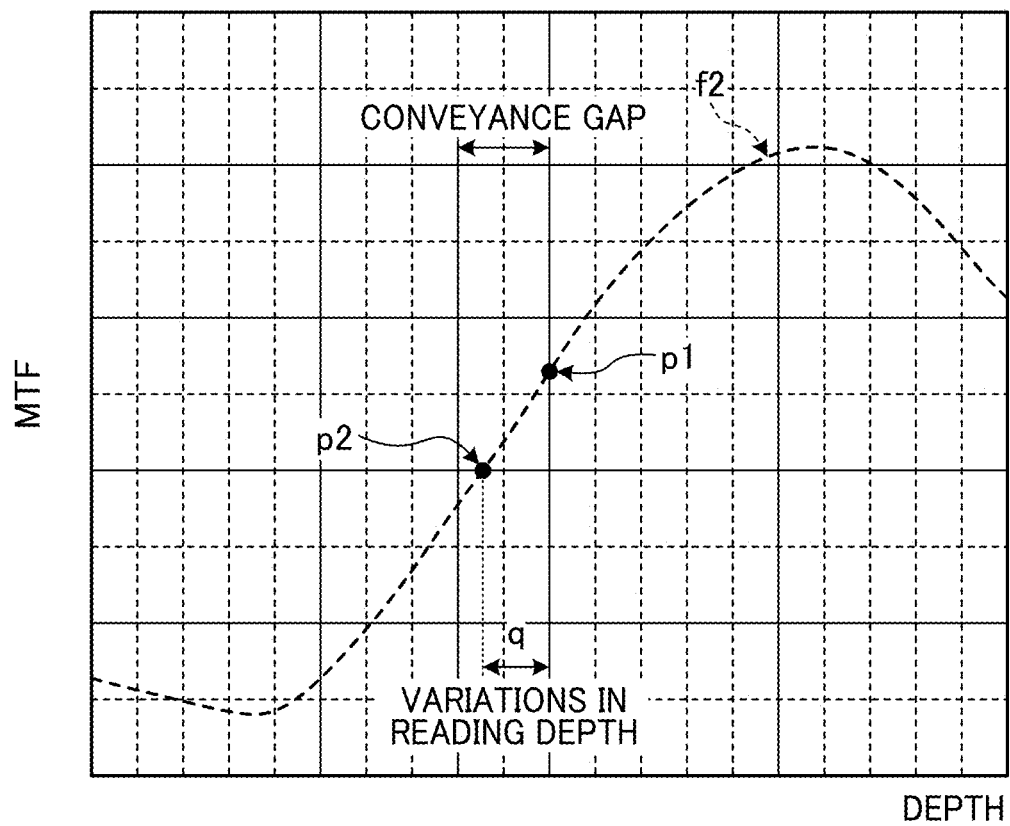
FIG. 8 is a diagram illustrating the variations in reading depth when the document pattern varies, according to an embodiment of the present disclosure.

FIG. 8 is a diagram illustrating the variations in reading depth when the document pattern varies, according to the present embodiment.

Figure 7A:
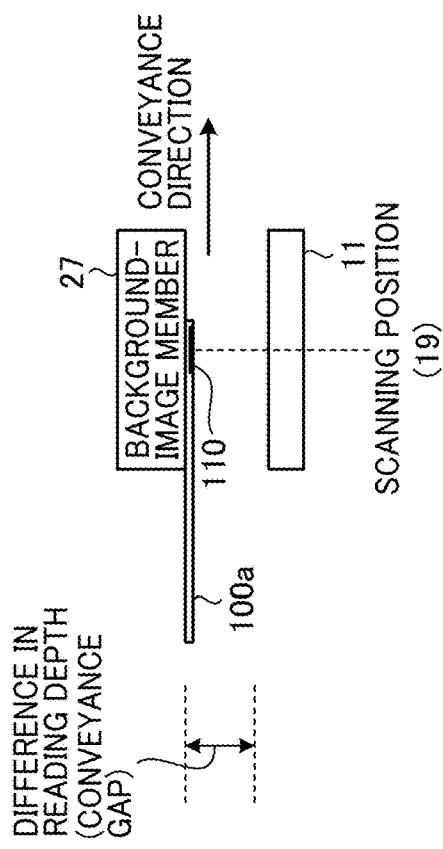
FIG. 7A, FIG. 7B, FIG. 7C, and FIG. 7D are diagrams illustrating a plurality of document patterns according to an embodiment of the present disclosure.
Figure 7B:
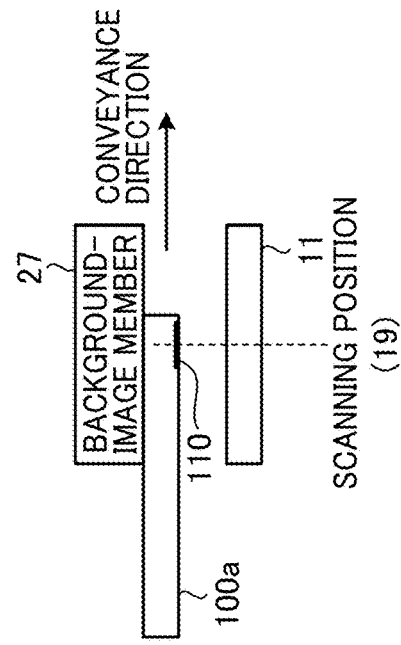
Figure 7C:
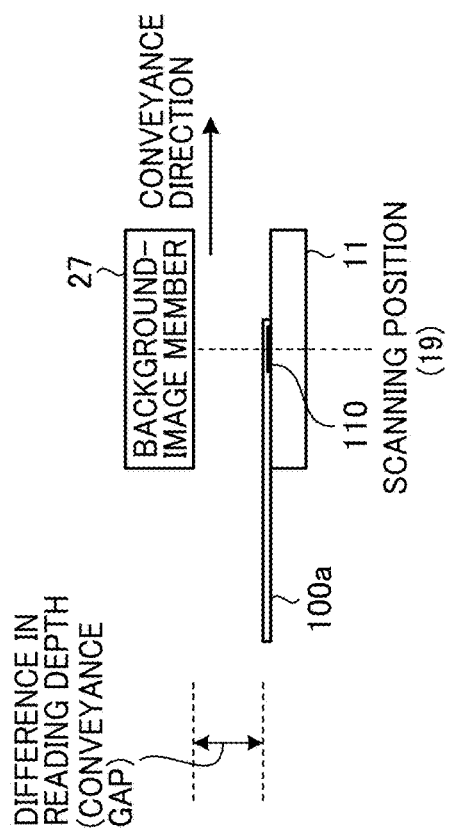
Figure 7D:
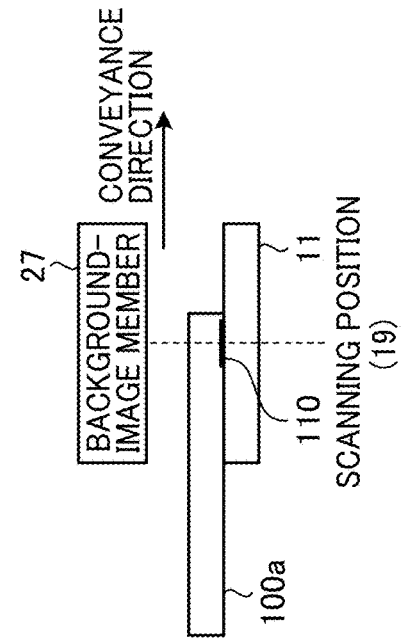

FIG. 7A, FIG. 7B, FIG. 7C, and FIG. 7D illustrate the patterns of passing position that are document patterns when the document 100 is a thin sheet and are document patterns when the document 100 is a thick sheet. FIG. 7A and FIG. 7B illustrate patterns at a position through which a thin sheet passes, and FIG. 7C and FIG. 7D illustrate patterns at a position through which a thick sheet passes. FIG. 7A and FIG. 7C illustrate cases in which a thin sheet or a thick sheet is conveyed on the scanning window 19 or the contact glass 11 side, and FIG. 7B and FIG. 7D illustrate cases in which a thin sheet and a thick sheet is conveyed on the background-image member 27 side.

In FIG. 8, a point p1 indicates the MTF value of the second image read when a thin paper is scanned on the scanning window 19 side as illustrated in FIG. 7A. A point p2 indicates the MTF value of the second image read when a thin paper is conveyed and scanned on the background-image member 27 side as illustrated in FIG. 7B. In other words, if the MTF characteristics f2 is known, the difference between the point p1 and the point p2 in the reading-depth direction is obtained as the variations q.

On the other hand, the same applies to the case of using a thick sheet. In other words, in the present embodiment, as the detection pattern 110 on the document surface 100a is read, the plane to be read is at the same height or at the same passing position between when a thick sheet passes on the scanning window 19 side and when a thin sheet passes on the scanning window 19 side. Due to such a configuration, the reference MTF value takes the same value p1. Accordingly, the variations in the reading-depth direction of the document 100 can be obtained regardless of the paper thickness of the document 100.

With the above-described configuration, the flap of the document 100 or the degree of flap can be detected using the second image obtained by reading the detection pattern 110 on the document reading surface, which is the document surface 100a in the present embodiment. Moreover, as the variations q in the reading-depth direction due to flap is also obtained, the first image can be corrected to the image at the reference position according to the variations q. A method of correcting the first image using the corrector 34 is described below.

For example, when the document 100 is read using a reduction optical system and the document 100 flaps at the scanning position, the magnifying power for the first image which to be read changes. Accordingly, as a correction method, a correction method when the variations q are obtained from the second image in the second detector 33 and the magnification power for the first image held by the first detector 32 is corrected by the corrector 34 is described below.

FIG. 9, FIG. 10, FIG. 11, and FIG. 12 are diagrams each illustrating a correction method using the corrector 34, according to the present embodiment.

Figure 9:
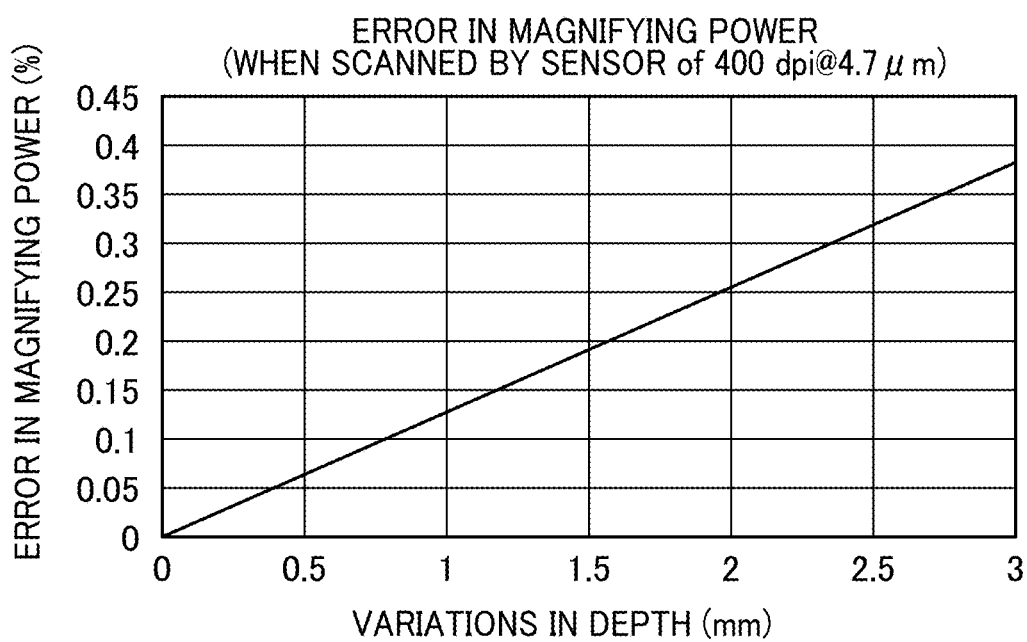
FIG. 9 is a diagram illustrating the relation between changes in reading-depth direction and changes in magnification, according to an embodiment of the present disclosure.

FIG. 9 is a diagram illustrating the relation between the changes in the reading-depth direction and changes in magnification when an image is read by a line sensor with a pixel size of 4.7 micrometers (μm) at the resolution of 400 dots per inch (dpi), according to the present embodiment.

Figure 10:
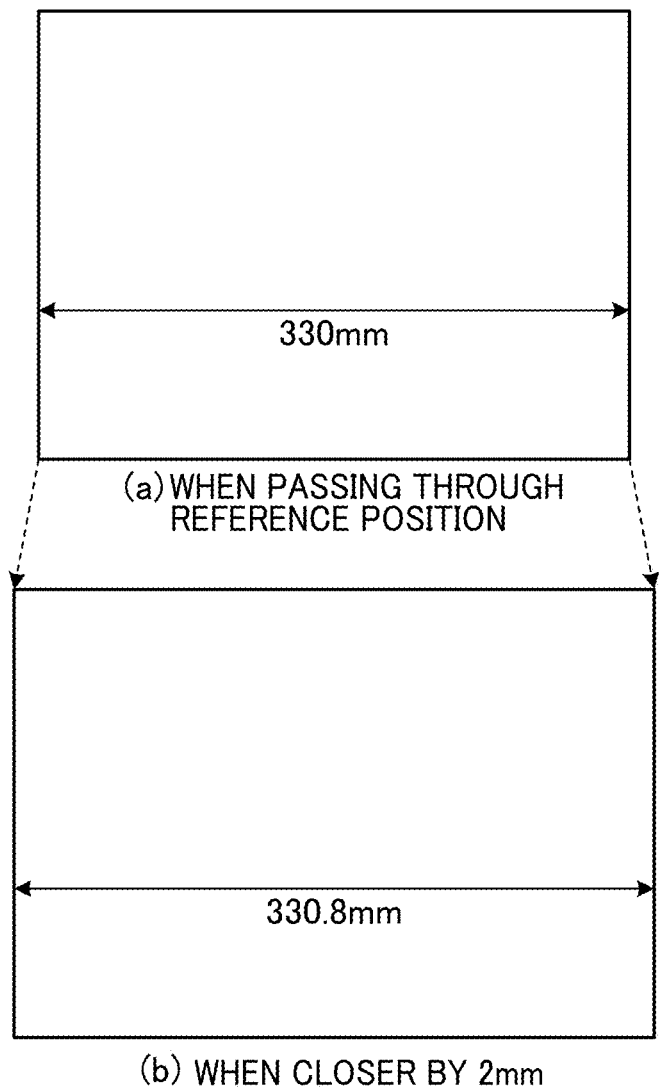
FIG. 10 is a diagram illustrating the width of a sheet that is magnified depending on the reading depth, according to an embodiment of the present disclosure.

FIG. 10 is a diagram illustrating the width of a sheet that is magnified depending on the reading depth, according to the present embodiment.

For example, it is assumed that the scanner 31 under the same condition as the condition in FIG. 9 is used and the document surface 100a is scanned at the scanning position closer by 2 mm in the reading-depth direction with reference to the reference position. In such cases, the sheet width 330 mm read when the sheet is passing through the reference position 0 mm as illustrated in (a) of FIG. 10 is magnified by 0.25% when passing through an area closer by 2 mm than the reference position, and its sheet width is read as 330.8 mm as illustrated in (b) of FIG. 10.

In order to handle such a situation, the width of a sheet of the first image after reading is corrected based on the relation in magnification as depicted in FIG. 9 and the MTF characteristics of the second image as will be described below.

Figure 11:
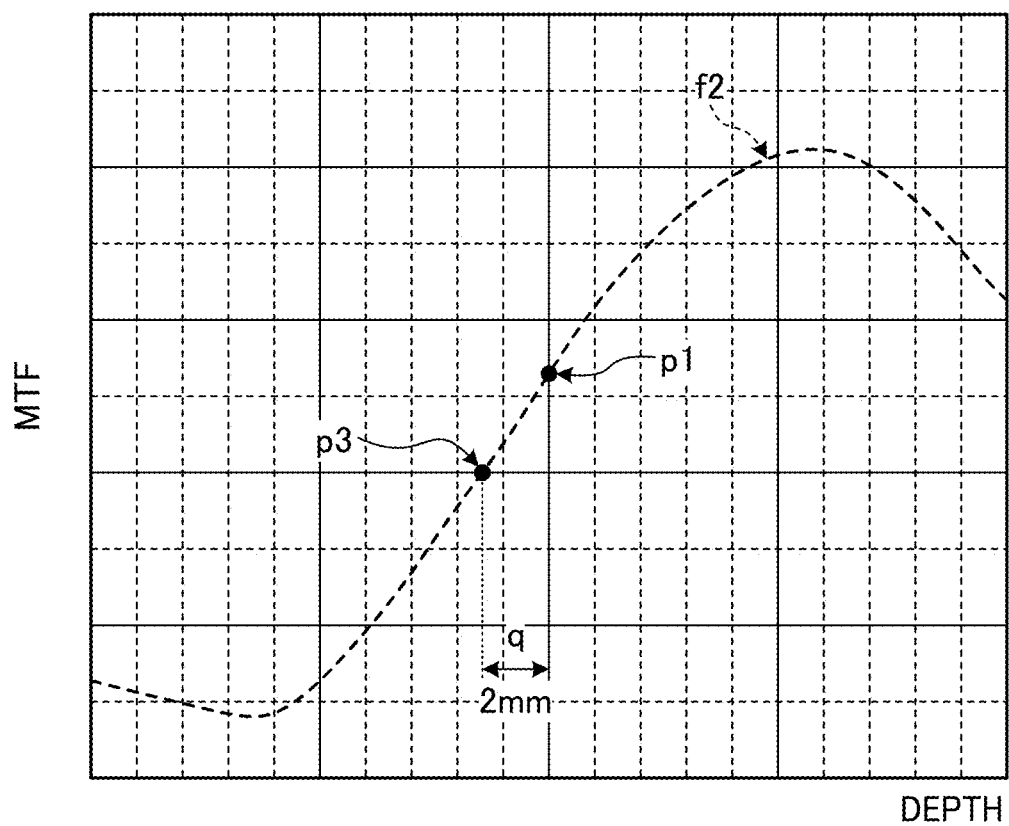
FIG. 11 is a graph illustrating MTF characteristics of a second image, according to an embodiment of the present disclosure.

FIG. 11 is a graph illustrating the MTF characteristics of the second image, according to the present embodiment.

Figure 12:
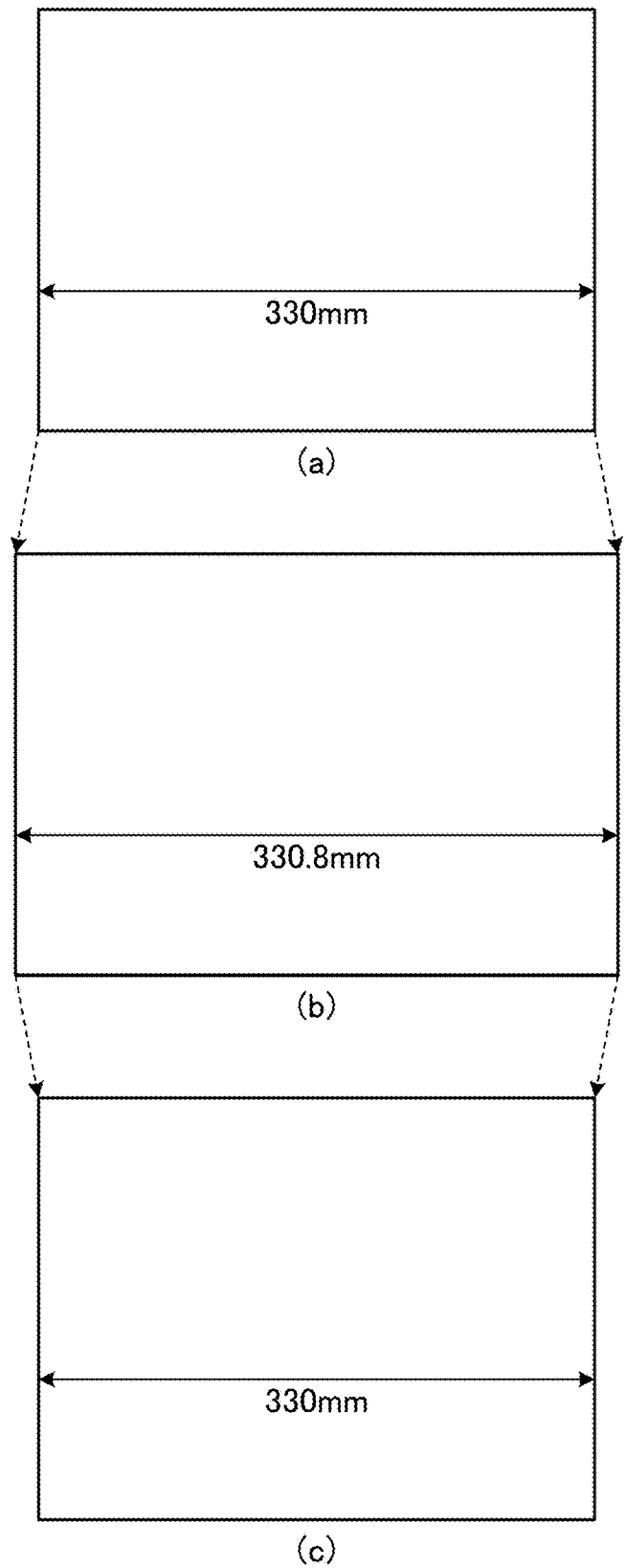
FIG. 12 is a diagram illustrating the width of a sheet on which a first image has been corrected, according to an embodiment of the present disclosure.

FIG. 12 is a diagram illustrating the width of a sheet on which the first image has been corrected, according to the present embodiment.

The second detector 33 uses the MTF value at the reference position grasped in advance and the MTF value detected from the second image where appropriate to obtain the variations q in the reading-depth direction from the MTF characteristics f2 in FIG. 11.

For example, as illustrated in FIG. 11, it can be calculated that the document has passed at a position p3 closer than the reference position p1 of the MTF characteristics f2 by 2 mm in the reading-depth direction. The corrector 34 detects that the magnification for reading is increased by 0.25% based on the magnification indicated in FIG. 9 as the document has passed through a close position by 2 mm, and reduces the magnification of the first image by 0.25% that corresponds to the increased magnification for reading. In other words, as illustrated in (a) of FIG. 12, (b) of FIG. 12, and (c) of FIG. 12, the first image in which the width of the sheet is magnified for view to 330.8 mm (see (b) of FIG. 12) is reduced for view to the sheet width of 330 mm (see (c) of FIG. 12) so as to be aligned with the sheet width of 330 mm (see (a) of FIG. 12) read at the reference position.

The correction of the first image may be performed on a line-by-line basis in regard to the lines of a line sensor, or may be performed collectively for a plurality of lines. The line sensor is not limited to a plurality of line sensors, and may be changed to any line sensor where appropriate as long as it receives light in different wavelength regions and converts the received light into an electrical signal.

Moreover, it is desired that the correction of the first image be excluded from the object to be corrected when the read value has optical dependence on a location within a region such as one line in which collective correction is performed based on one representative point on the surface of a recording medium. For example, in the characteristics of the MTF, the changes in characteristics due to the changes in reading depth may be largely changed according to the position in the main scanning direction depending on the characteristics of the lens to be used. In such cases, if the entire range in the main scanning direction is corrected based on the detection at one representative point, insufficient correction or excessive correction may occur at some portions due to a difference in changes in characteristics. For this reason, when such characteristics or the like are present on a lens, such an image is excluded from the target of the correction.

In the above embodiments of the present disclosure, the MTF characteristics are used as a concrete example of the amount of characteristic. However, no limitation is intended thereby, and the amount of characteristic is not limited to the MTF characteristics. Other kinds of amount of characteristic may be adopted as long as such amounts of characteristics the first image and the second image have different characteristics. For example, other kinds of amount of characteristic may be adopted when the second image has characteristics in which changes in value in the reading-depth direction are greater than those of the first image. Moreover, other kinds of amount of characteristic may be adopted, preferably, when the first image has smaller changes than the second image, the second image has larger changes than the first image, and these changes are steady.

Due to those configurations as described above, when the reading depth for the document surface 100a to be read is changed due to, for example, the flap of the document while the conveyance, the changes in MTF are detected from the detection pattern 110 on the same document surface 100a as the object to be read. Accordingly, the variations in the reading-depth direction can be accurately detected without depending on the thickness of the document 100.

First Modification

In the first embodiment of the present disclosure, by way of example, the detection pattern 110 is arranged on a white sheet with black ink or toner (see FIG. 5A and FIG. 5B). However, the combination of colors is not limited to the above combination of colors.

Figure 13:
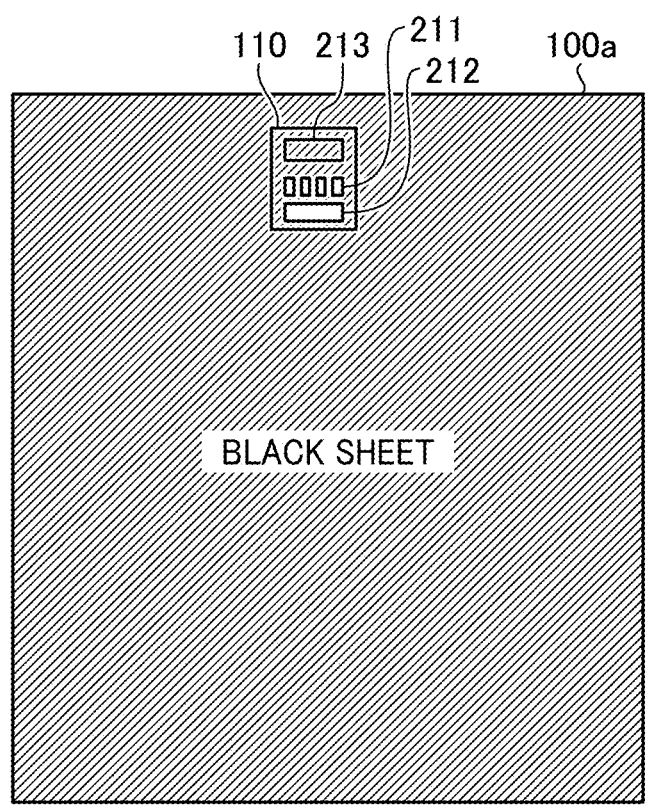
FIG. 13 is a diagram illustrating detection patterns according to a first modification of the above embodiments of the present disclosure.

FIG. 13 is a diagram illustrating the detection pattern 110 according to a first modification of the above embodiments of the present disclosure.

As illustrated in FIG. 13, the detection pattern 110 may be arranged on a black document with white ink or toner. In such a configuration, the reading device reads a black background portion 213 of a black sheet, vertical line patterns 211 formed of white ink or toner, and a white solid fill 212 as the detection pattern 110 to obtain an MTF value. Also in this configuration, black has good absorptivity when light in an infrared range is emitted thereto. For this reason, an image having high contrast between a white portion and a black background portion can be obtained as the second image. For example, the reading system according to the present modification can also be implemented with a similar configuration in which the detection pattern 110 is irradiated with infrared light and the reflected light is received by a line sensor having light-receptive sensitivity for the light in an infrared range.

Moreover, as long as the MTF value can be detected from the second image, the combination of colors may be changed as appropriate according to, for example, the color of the background of the document and the configuration of the reading system.

According to the combination of colors, it is desired that the configuration of the reading system be configured so that the MTF characteristics of the second image changes steadily.

Second Modification

In the first embodiment, as illustrated in FIG. 5A and FIG. 5B, the detection pattern 110 that can be read by human eyes under visible light is described. However, no limitation is indicated thereby, and a detection pattern that cannot be read by human eyes under visible light may be used. For example, a coloring material such as IR clear toner is known in the art that cannot be read by human eyes under visible light but emits light of a specific visible color when irradiated with infrared light. If a detection pattern made of such a coloring material is used, the document surface 100a may be irradiated with infrared light to obtain a detection pattern of visible light of a specific color as reflected by the document surface 100a. Then, the obtained detection pattern may be scanned by a line sensor having light-receptive sensitivity to the light of a specific visible color. For example, the obtained detection pattern may be scanned by a line sensor having light-receptive sensitivity in a area of visibility. As a result, a second image that includes the detection pattern can be detected.

FIG. 14A, FIG. 14B, FIG. 14C, and FIG. 14D are diagrams illustrating the detection pattern 110 according to a second modification of the above embodiments of the present disclosure.

Figure 14A:
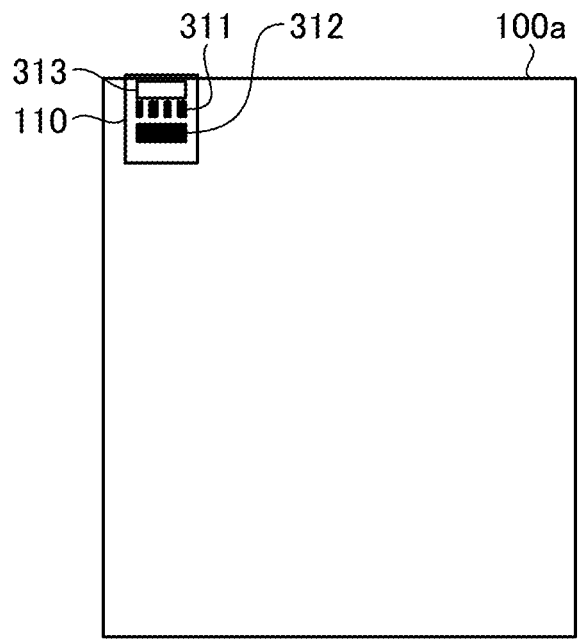
FIG. 14A, FIG. 14B, FIG. 14C, and FIG. 14D are diagrams each illustrating detection patterns according to a second modification of the above embodiments of the present disclosure.

FIG. 14A is a diagram illustrating a configuration of the detection pattern 110 made of an invisible coloring material such as an infrared (IR) clear toner that cannot be read by human eyes under visible light, according to the present embodiment. In FIG. 14A, a vertical-line pattern 311 illustrated in black and a solid-fill portion 312 illustrated in black are arranged with an invisible coloring material.

Figure 14B:
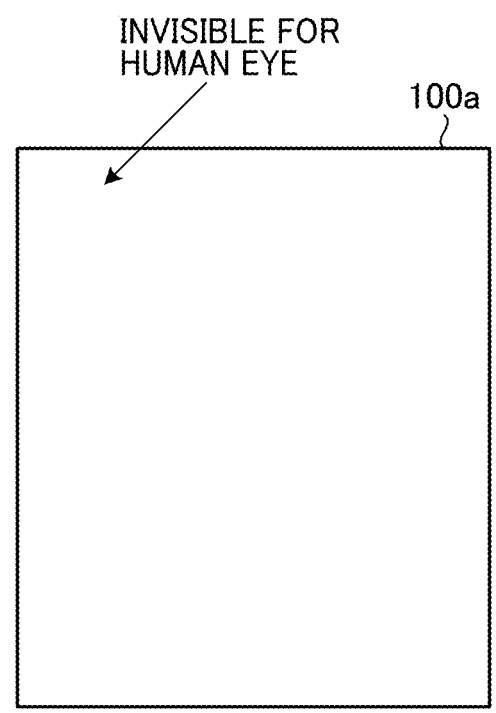

FIG. 14B illustrates how the document surface 100a of FIG. 14A is formed under visible light. As illustrated in FIG. 14B, the detection pattern 110 cannot be read by human eyes under visible light.

Figure 14C:
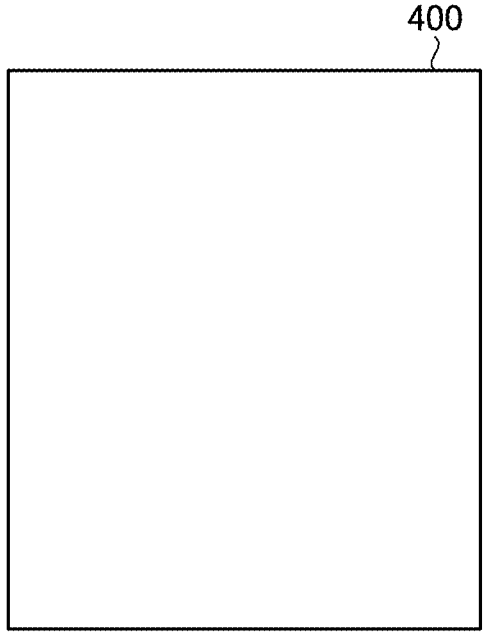
Figure 14D:
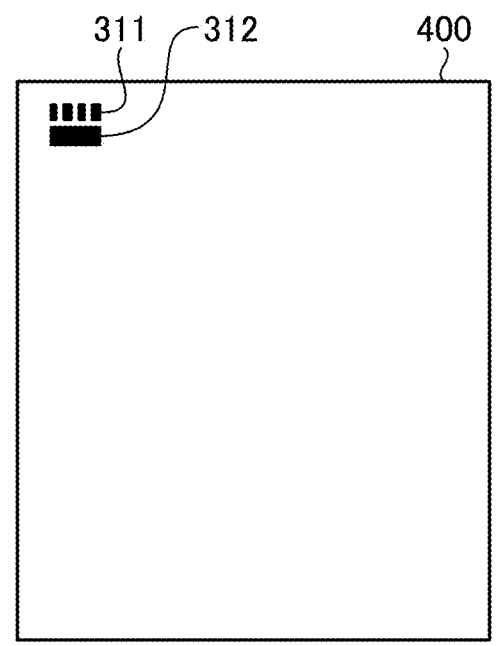

FIG. 14C illustrates a read image 400 when the document surface 100a of FIG. 14A is irradiated with the visible light emitted from the scanner 31 and the reflected light is read by a line sensor whose optical range is adapted for visible light. Such a read image may be referred to as a second image 400 in the following description. FIG. 14C is given to be compared with FIG. 14D. However, the detection pattern 110 cannot be detected from the second image 400. FIG. 14D illustrates the read image 400 or the second image 400 when the document surface 100a of FIG. 14A is irradiated with the infrared light emitted from the scanner 31 and the reflected light is read by a line sensor whose optical range is adapted for visible light of specific color. As is understood from the display state in FIG. 14D, the detection pattern 110 can be detected from the second image 400 when the combination in the reading system is as described above.

As described above, an invisible coloring material may be used for the detection pattern 110. When the detection pattern 110 using the invisible coloring material is used, the pattern on the document surface 100a is read under the visible light in a similar manner to the recognition of human eyes. By contrast, the pattern is removed under the infrared light, and the detection pattern 110 appears as if it floats up. Accordingly, the detection pattern can be arranged without causing any actual damage on the document or the print image.

Third Modification

In the first embodiment, the reading system in which the document image on the document surface 100a is read in an area of visibility and the detection pattern 110 is read in an area of infrared light is described by way of example. However, no limitation is intended thereby, and the detection pattern 110 may be read in an area of visibility.

FIG. 15 is a diagram illustrating a configuration of a reading system and a correction unit of a reading device according to a third modification of the above embodiments of the present disclosure.

As illustrated in FIG. 15, a first scanner 41 and a second scanner 42 are arranged as the scanner 31.

The first scanner 41 includes a first light source 41a and a first imaging device 41b, and irradiates the document surface 100a with the light in a first area of visibility emitted from the first light source 41a. Then, the reflected light is captured by the first imaging device 41b having light-receptive sensitivity in the first area of visibility.

The second scanner 42 includes a second light source 42a and a second imaging device 42b, and irradiates the document surface 100a with the light in a second area of visibility emitted from the second light source 42a. Then, the reflected light is captured by the second imaging device 42b having light-receptive sensitivity in the second area of visibility. The first light source 41a and the second light source 42a may be shared in common.

Also in the present modification of the above embodiments, the first imaging device 41b is optically adjusted so that the MTF characteristics are optimized on the first image, and the second image is adjusted intentionally so that the changes in characteristics in the conveyance gap steadily change. For example, in the second imaging device 42b, a part or all of the optical path of the reading system is made different from that of the first imaging device 41b. For example, different optical components may be used or the arrangement of the optical components may be adjusted so that the MTF characteristics vary depending on the optical path. By such adjustment in optical system, the MTF characteristics of the first image and the second image are set to be different from each other.

Fourth Modification

Moreover, in the third modification, when reading of two or less colors of RGB is possible in reading of the first image, two or less colors of RGB may be used for the first image and the remaining one color of RGB may be used for the second image. For example, as monochrome printing can be expressed by one color, one color of RGB such as R is used for the first image and the remaining color such as B and G is used for the second image.

Figure 16:
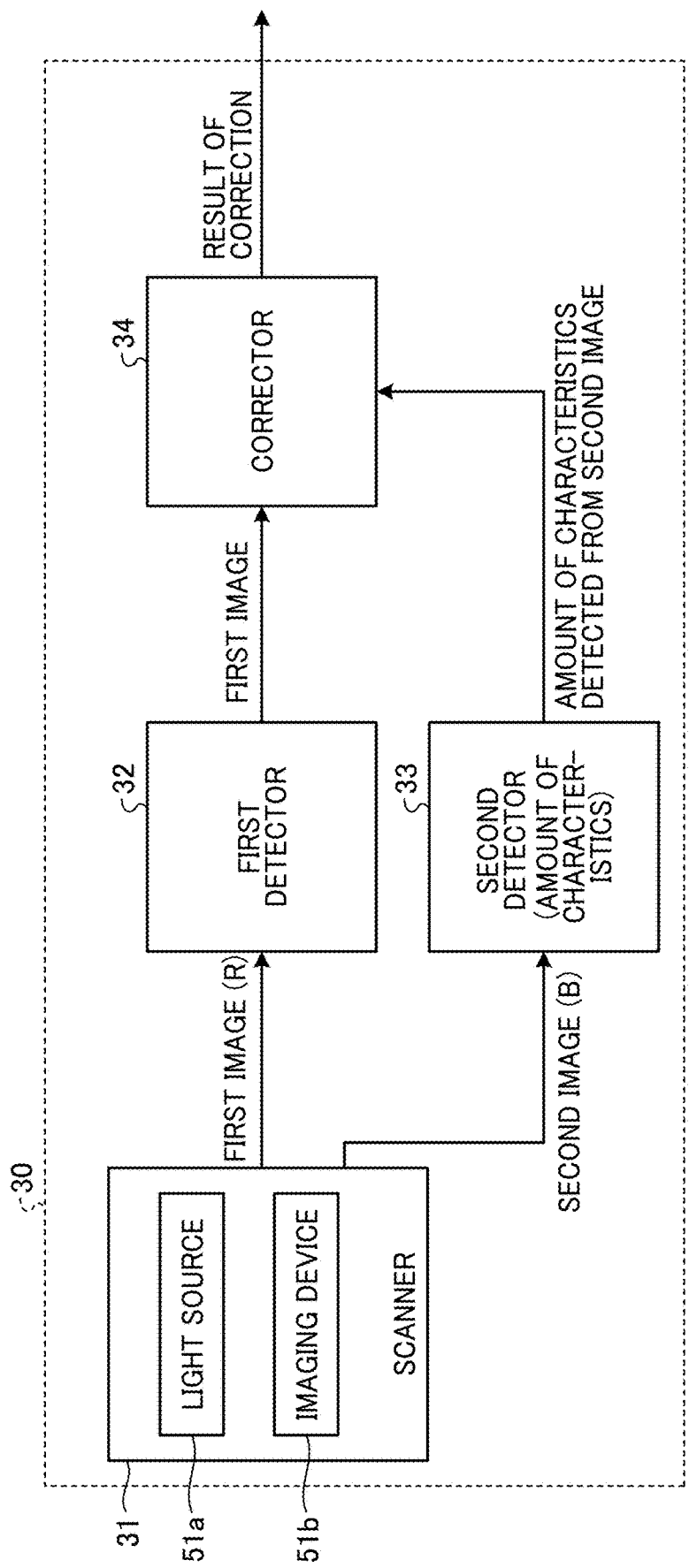
FIG. 16 is a diagram illustrating a configuration of a reading system and a correction unit of a reading device according to a fourth modification of the above embodiments of the present disclosure.

FIG. 16 is a diagram illustrating a configuration of a reading system and a correction unit of a reading device according to a fourth modification of the above embodiments of the present disclosure.

As illustrated in FIG. 16, in the present modification, for example, white light-emitting diodes (LEDs) are used for the light source 51a, and for example, line sensors of R and B are provided for the imaging device 51b to perform imaging. Alternatively, LEDs of corresponding colors such as red, green, and blue (RGB) may be used. The R image is output as the first image, and the B image is output as the second image. Also in the present modification of the above embodiments, the imaging device 51b is optically adjusted so that the MTF characteristics of R are optimized to obtain the first image, and the MTF characteristics of B are adjusted so as to change steadily in the conveyance gap to obtain the second image. By so doing, even when the document 100 flaps in the depth direction in the conveyance gap, the amounts of characteristics that changes from the B image on the second image in the reading-depth direction can precisely be detected while minimizing the changes in characteristics in the depth direction on the R image of the first image.

Fifth Modification

In the first embodiment of the present disclosure, a document that has the vertical line pattern 111, the black solid-fill portion 112, and the white blank portion 113 as the detection pattern 110 (see FIG. 5A and FIG. 5B) is used, and the document is scanned to calculate the MTF value. However, no limitation is indicated thereby, and a simpler configuration than that of the first embodiment may be employed.

Figure 17A:
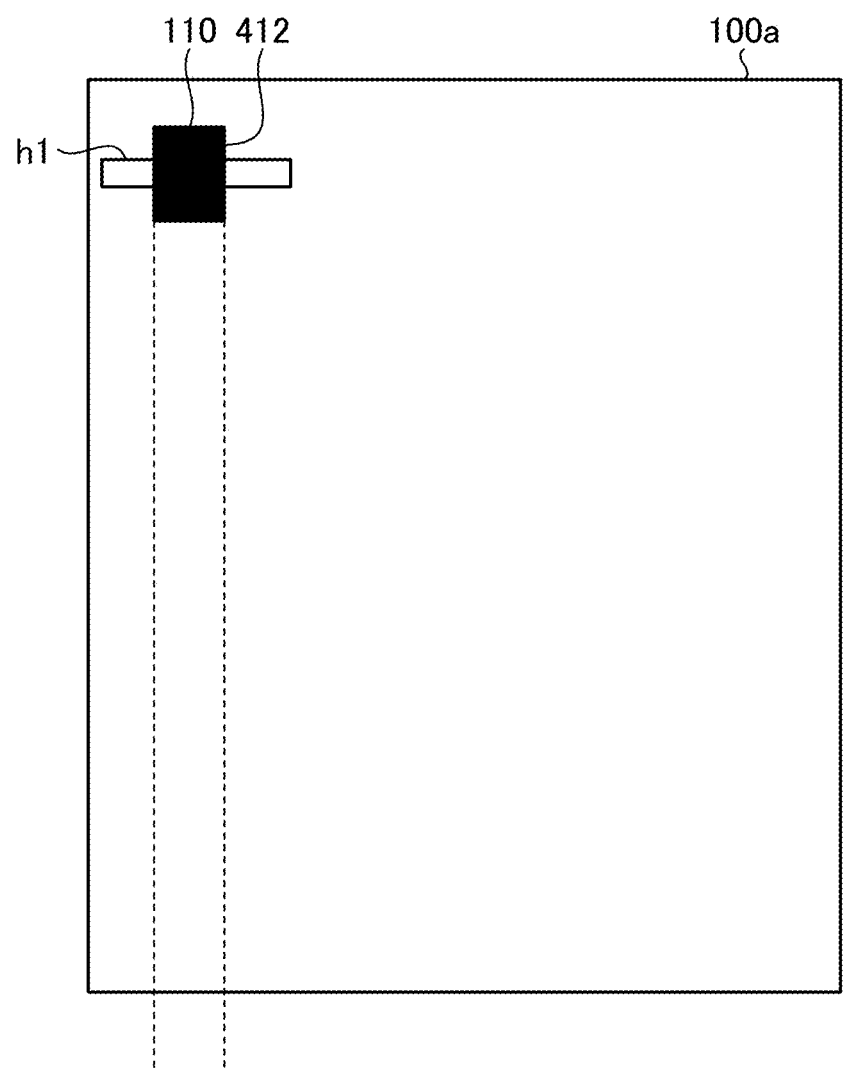
FIG. 17A and FIG. 17B are diagrams each illustrating detection patterns according to a fifth modification of the above embodiments of the present disclosure.
Figure 17B:
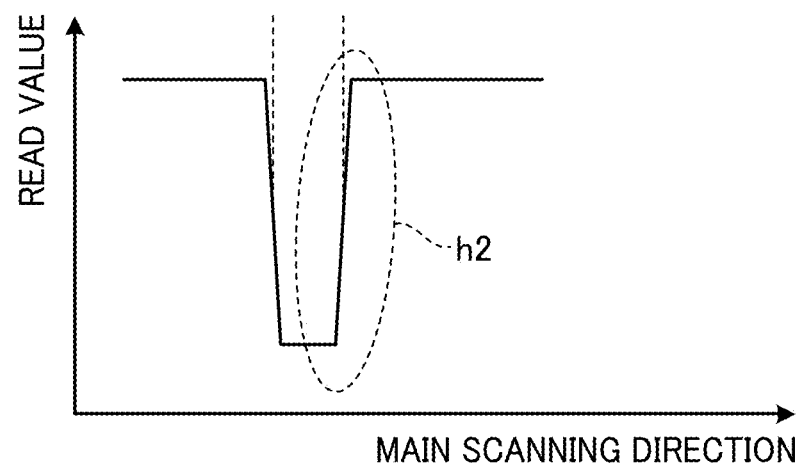

FIG. 17A and FIG. 17B are diagrams each illustrating the detection patterns according to a fifth modification of the above embodiments of the present disclosure.

More specifically, FIG. 17A illustrates a read image obtained by reading, as the second image, the black solid-fill portion 412 on the document surface 100a of a white writing paper. The boundary between the black solid-fill portion 412 and the white blank space may be any region as long as the region has a large density change on the image. Alternatively, only the black solid-fill portion 412 may be arranged. In this image read as the second image, the distribution of read values in the main scanning direction including the boundary between the white blank space of the document and the black solid-fill portion 412 becomes as illustrated in FIG. 17B. In other words, the distribution of read values in the range of a frame h1 becomes as illustrated in FIG. 17B.

As illustrated in FIG. 17B, the read value changes at the boundary between the black solid-fill portion 412 and the white blank space. In order to handle such a situation, in the fifth modification of the above embodiments of the present disclosure, the MTF value of a region of interest h2 as illustrated in FIG. 17B where the color changes from black to white is obtained.

Figure 18B:
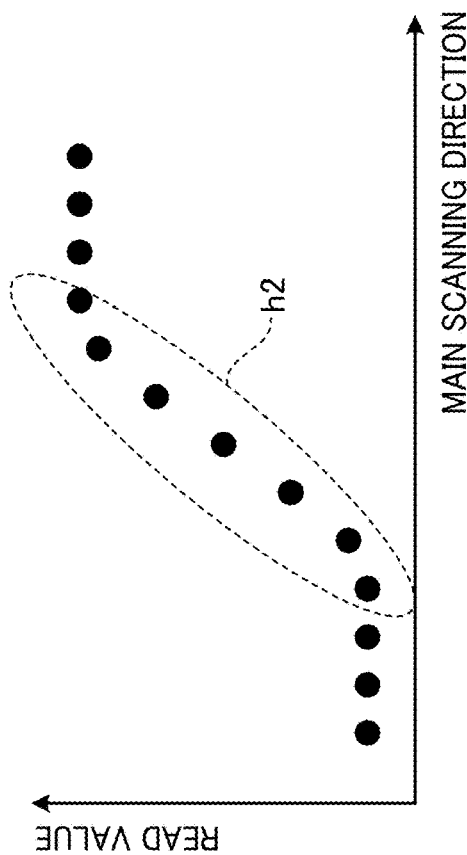
FIG. 18A and FIG. 18B are magnified views of the distribution of values read from a region of interest, according to the fifth modification of the above embodiments of the present disclosure.
Figure 18A:
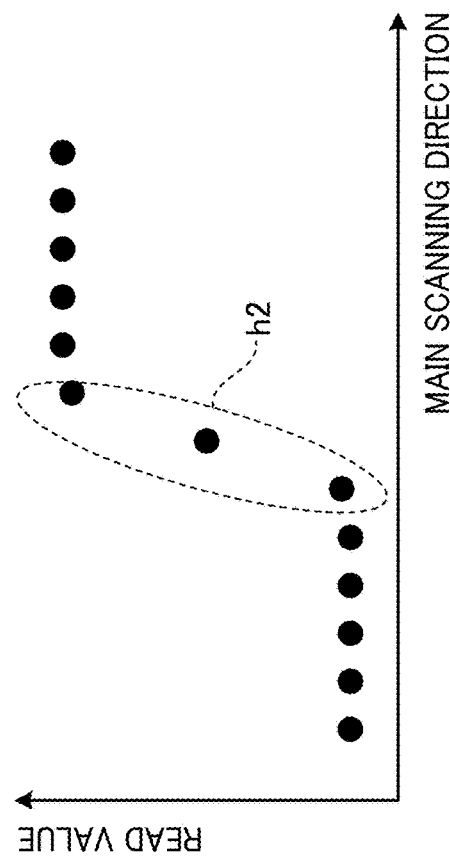

FIG. 18A and FIG. 18B are magnified views of the distribution of values read from the region of interest h2 of FIG. 17B, according to the fifth modification of the above embodiments of the present disclosure.

FIG. 18A illustrates a case in which the MTF of the read image is high as the color sharply changes from black to white, according to the fifth modification of the above embodiments of the present disclosure. More specifically, the MTF changes from black to white in two pixels in the present modification. FIG. 18B illustrates a case in which the MTF of the read image is low as the color gradually changes from black to white, according to the fifth modification of the above embodiments of the present disclosure. More specifically, the MTF changes from black to white in six pixels in the present modification. In the present embodiment, for example, assuming that the state as illustrated in FIG. 18A indicates a read image at a focal point, the state as illustrated in FIG. 18B indicates a read image when the MTF varies in the reading-depth direction. In other words, the state as illustrated in FIG. 18B indicates an out-of-focus image. Accordingly, the variations in the reading-depth direction can also be obtained by obtaining the steepness of the change from black to white in the region of interest h2.

In order to achieve such a configuration, the relation between the second MTF characteristics f2 and the number of pixels that change from black to white is obtained in advance.

Figure 19:
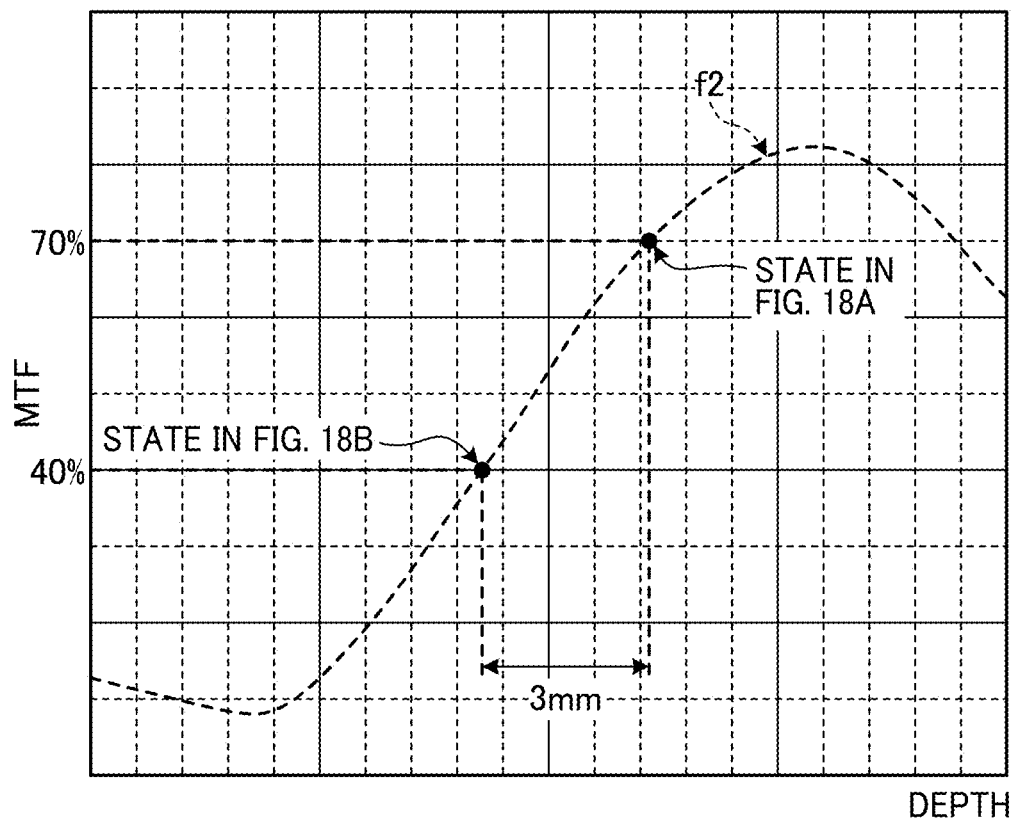
FIG. 19 is a graph illustrating changes in MTF from a reference position in percentage in the second MTF characteristics, according to the fifth modification of the above embodiments of the present disclosure.

FIG. 19 is a graph illustrating the changes in MTF from a reference position in percentage in the second MTF characteristics f2, according to the fifth modification of the above embodiments of the present disclosure.

FIG. 20 is a diagram illustrating a setting table in which the relation between the number of pixels and the MTF (%) when the color changes from black to white is set based on the relation illustrated in FIG. 19, according to the fifth modification of the above embodiments of the present disclosure.

The reading device obtains the number of the pixels that change from black to white at the boundary of the black solid-fill portion 412 from the second image, and extracts the MTF (%) indicated in the table of FIG. 20 as the MTF corresponding to the obtained number of pixels. Then, the reading depth is obtained based on the extracted MTF.

For example, when the number of the pixels changing from black to white is 2, the MTF determined to be 70% based on the table of FIG. 20. When the number of pixels is 6, the MTF is determined to be 40% based on the table of FIG. 20. From the MTF characteristics illustrated in FIG. 19, it is understood that the reading depth differs by 3 mm between when the MTF is 70% and when the MTF is 40%. As a result, when the number of pixels is 6, it can be detected that the document has moved and changed from the focal point by 3 mm in the reading-depth direction.

In the present modification of the above embodiments, the black solid-fill portion 412 is arranged on the document as the detection pattern 110. However, no limitation is intended thereby, and the coloring material is not limited to black. For example, a coloring material such as an IR clear toner may be used. If the background is black, for example, a white coloring material may be used as appropriate.

Sixth Modification

As an alternative embodiment with simple configuration or structure, an MTF value may be detected from the result of reading an edge of sheet on the document surface 100a. The edge of sheet of the document surface 100a may be referred to as an edge of recording medium. A method of acquiring an MTF value according to a sixth modification of the above embodiments of the present disclosure is described below with reference to FIG. 21A, FIG. 21B, FIG. 22A, and FIG. 22B.

Figure 21A:
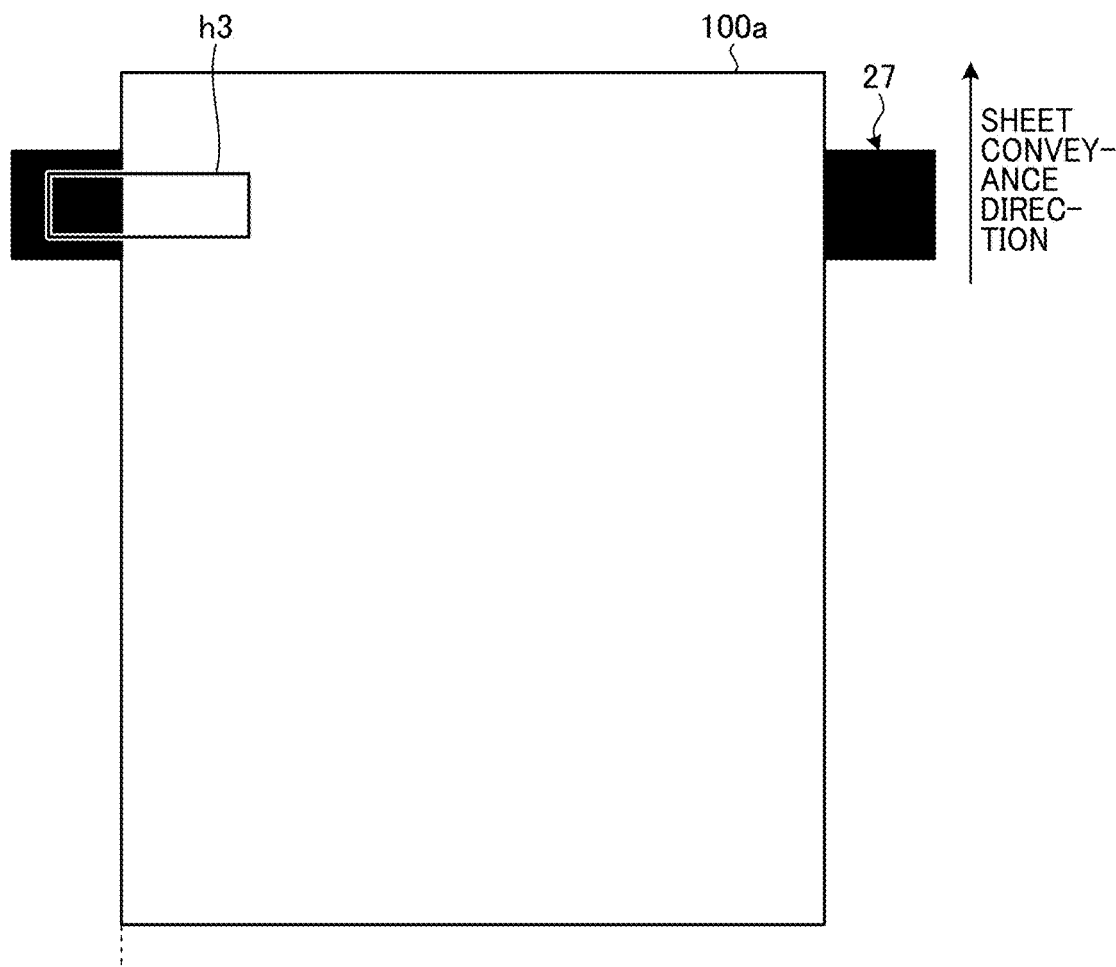
FIG. 21A and FIG. 21B are diagrams each illustrating detection patterns according to a sixth modification of the above embodiments of the present disclosure.
Figure 21B:
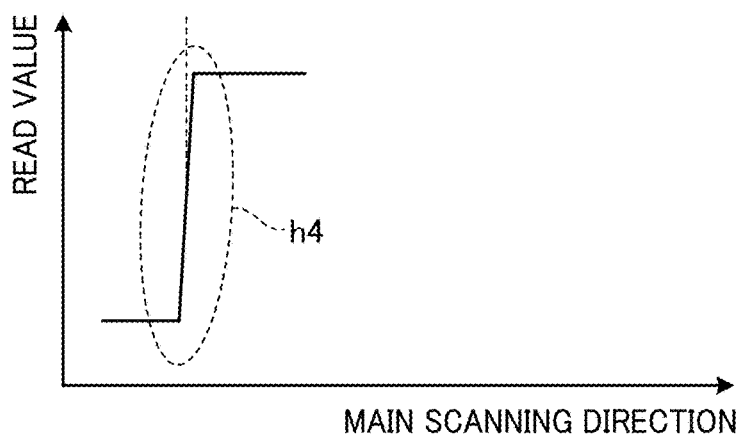

FIG. 21A and FIG. 21B are diagrams each illustrating the detection pattern 110, according to the sixth modification of the above embodiments of the present disclosure.

FIG. 21A illustrates a read image (second image) in which the background-image member 27 is black solid fill and the background-image member 27 is read together with the document surface 100a. In this read image, as illustrated in FIG. 21B, the read value changes in the range of a frame h3 at the boundary between the edge of the white document and the background-image member 27 that is black solid fill. Accordingly, the MTF value is obtained from a region of interest h4 in the distribution of the read value changing from black to white.

Figure 22A:
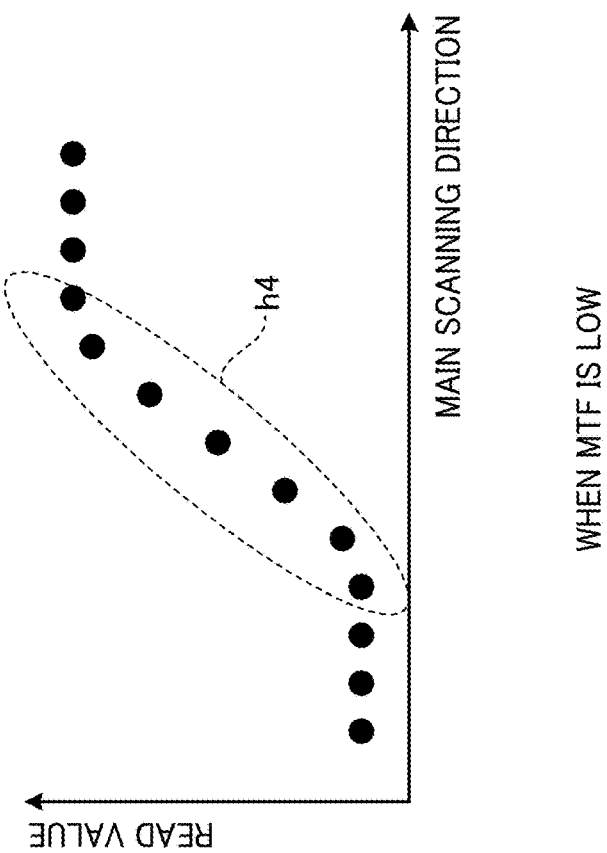
FIG. 22A and FIG. 22B are magnified views of the distribution of values read from a region of interest, according to an embodiment of the present disclosure.
Figure 22B:
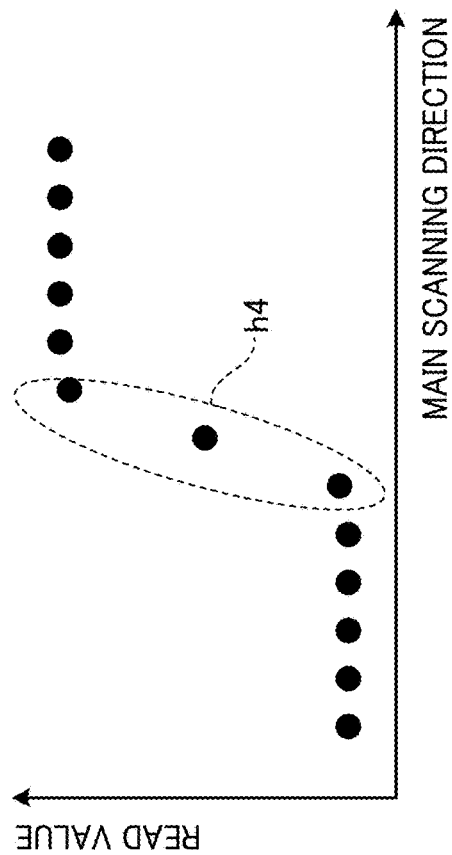

FIG. 22A and FIG. 22B are magnified views of the distribution of values read from the region of interest h4 as illustrated in FIG. 21B, according to the sixth modification of the above embodiments of the present disclosure.

FIG. 22A illustrates a case in which the MTF of the read image is high as the color sharply changes from black to white, according to the sixth modification of the above embodiments of the present disclosure. More specifically, the MTF changes from black to white in two pixels in the present modification. FIG. 22B illustrates a case in which the MTF of the read image is low as the color gradually changes from black to white, according to the sixth modification of the above embodiments of the present disclosure. More specifically, the MTF changes from black to white in six pixels in the present modification.

As described above, the steepness of the change from black to white, which is indicated in the number of pixels, can be obtained even at the boundary between the edge of the document and the background-image member 27. The method of obtaining the variations in the reading-depth direction from the obtained number of pixels is equivalent to that of the fifth modification as described above. For the sake of explanatory convenience, overlapping description is omitted.

Seventh Modification

In the above embodiments of the present disclosure, the MTF is used as the amount of characteristic. However, no limitation is indicated thereby, and the amount of characteristic is not limited to the MTF. For example, the changes in radiation intensity of light of the light reflected by the document may be used as the amount of characteristic. At the scanning position, the radiation intensity of light of the light reflected by the document changes in the conveyance gap due to the flap of the document.

Figure 23:
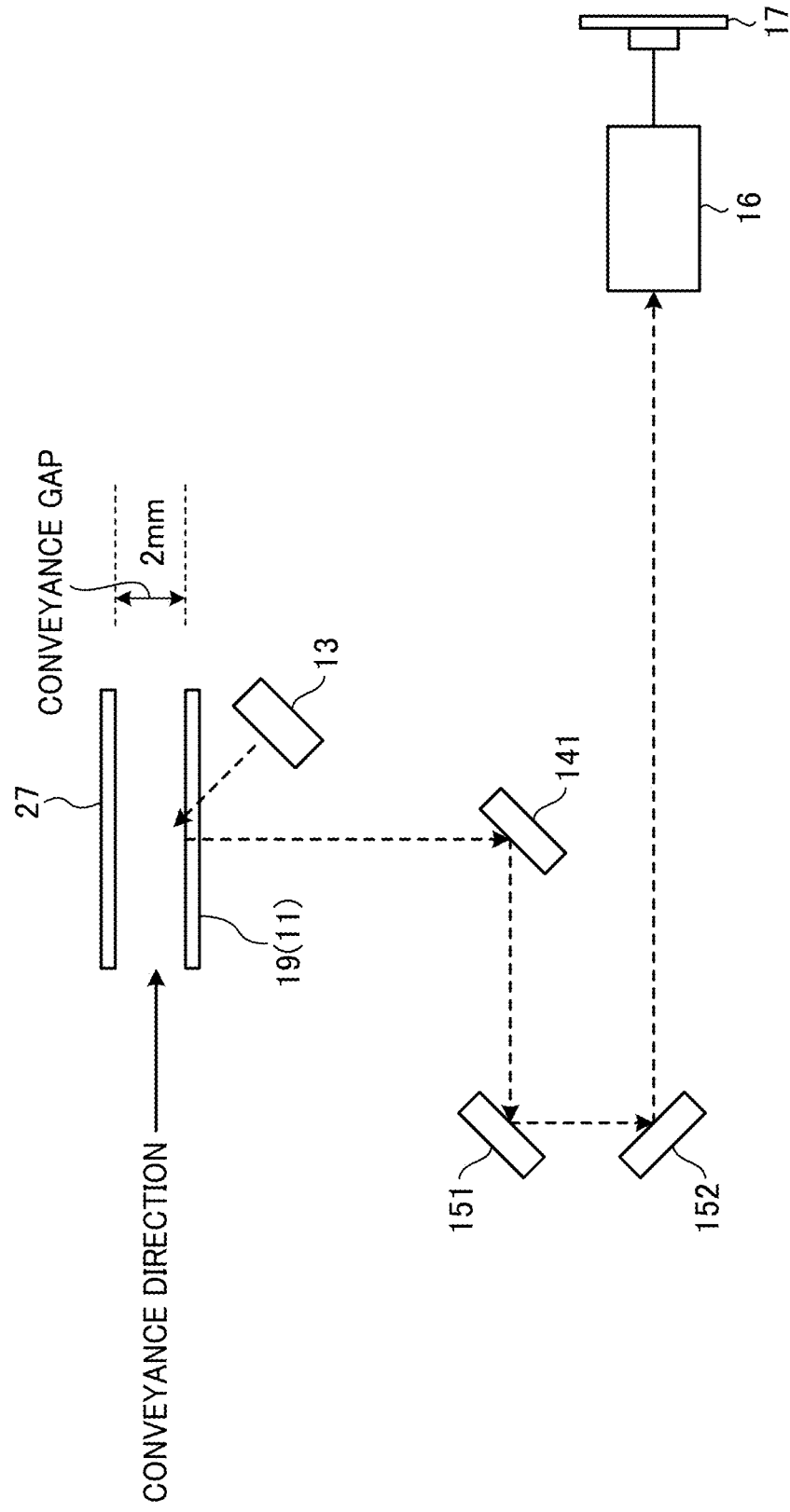
FIG. 23 is a diagram illustrating a configuration in which the conveying gap at a scanning position is 2 millimeters (mm), according to an embodiment of the present disclosure.
Figure 24:
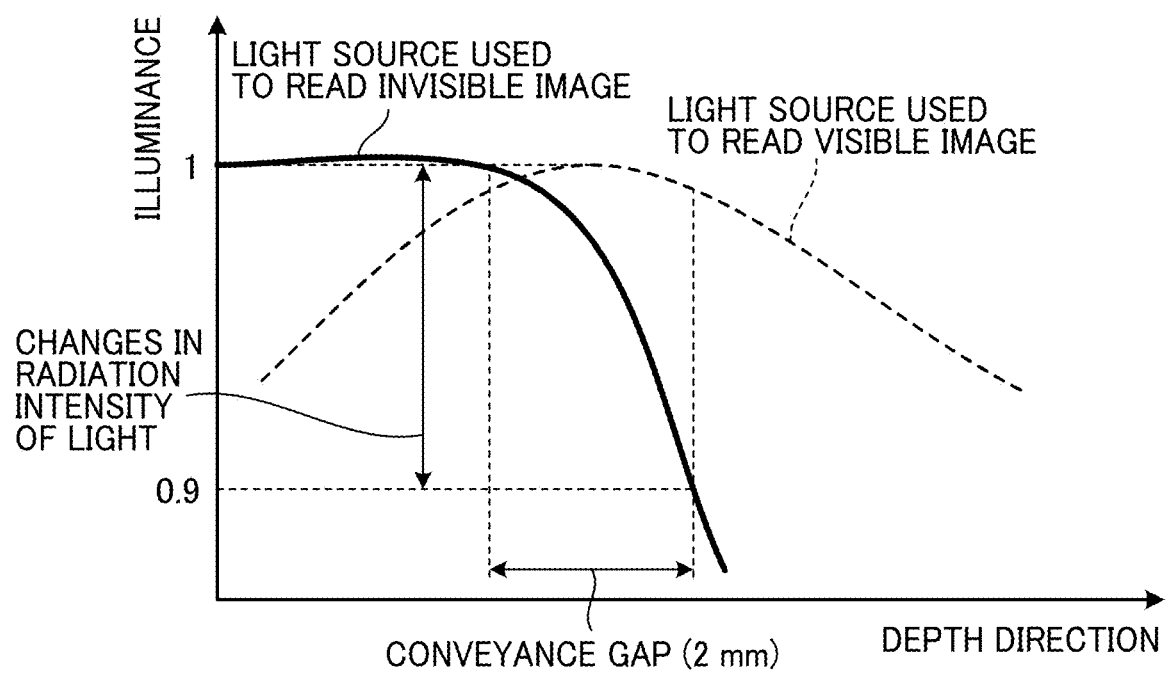
FIG. 24 is a diagram illustrating the relation between the reading depth and the illuminance of illumination, according to an embodiment of the present disclosure.

FIG. 23 and FIG. 24 are diagrams each illustrating the changes in radiation intensity of light of the light reflected by the document in the conveyance gap, according to the present embodiment.

More specifically, FIG. 23 illustrates a configuration in which the conveying gap at a scanning position is 2 mm, according to the present modification of the above embodiments of the present disclosure, and FIG. 24 illustrates the relation between the reading depth and the illuminance of illumination, according to the present modification of the above embodiments of the present disclosure. Such illuminance of illumination may be referred to as the illuminance on document plane or may be referred to simply as the illuminance in the following description. The changes in illuminance of illumination correspond to the changes in radiation intensity of light.

FIG. 24 illustrates the changes in illuminance of illumination of the light source between when a light source used to read visible images such as the first image reading is used as the light source 13 and when a light source used to read invisible images such as the second image is used as the light source 13, according to the present modification of the above embodiments of the present disclosure. In the present modification of the above embodiments of the present disclosure, the light source 13 is set so that the illuminance of the light source 13 is maximized to 1 when the conveyance gap is 0 mm and the document is conveyed on the contact glass 11 side. When the conveyance gap is 2 mm and the document is conveyed on the background-image member 27 side, the illuminance of the light source used to read invisible images is reduced by 10% to 0.9. This indicates that a difference in density of 10% occurs to the same document between when the document passes on the contact glass 11 side and when the document passes on the background-image member 27 side. Accordingly, in the seventh modification of the above embodiments of the present disclosure, a mode is described in which the reading depth is obtained using the changes in radiation intensity of light as the amount of characteristic.

Figure 26A:
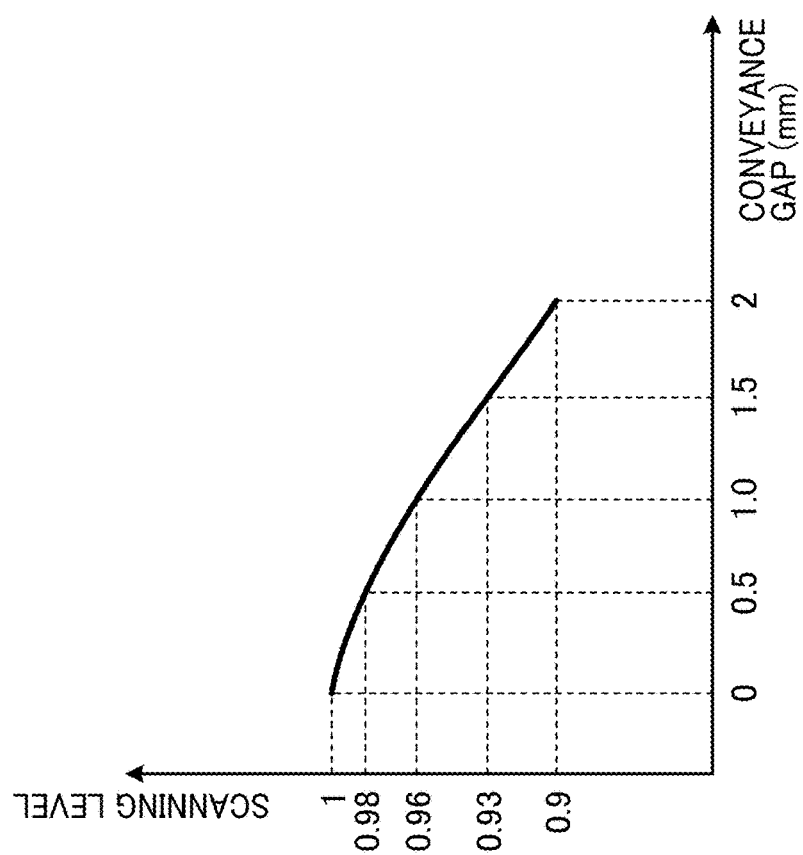
FIG. 26A and FIG. 26B are diagrams each illustrating a configuration in which the illuminance on document plane decreases by 10% when the conveyance gap is 2 mm, according to an embodiment of the present disclosure.
Figure 26B:
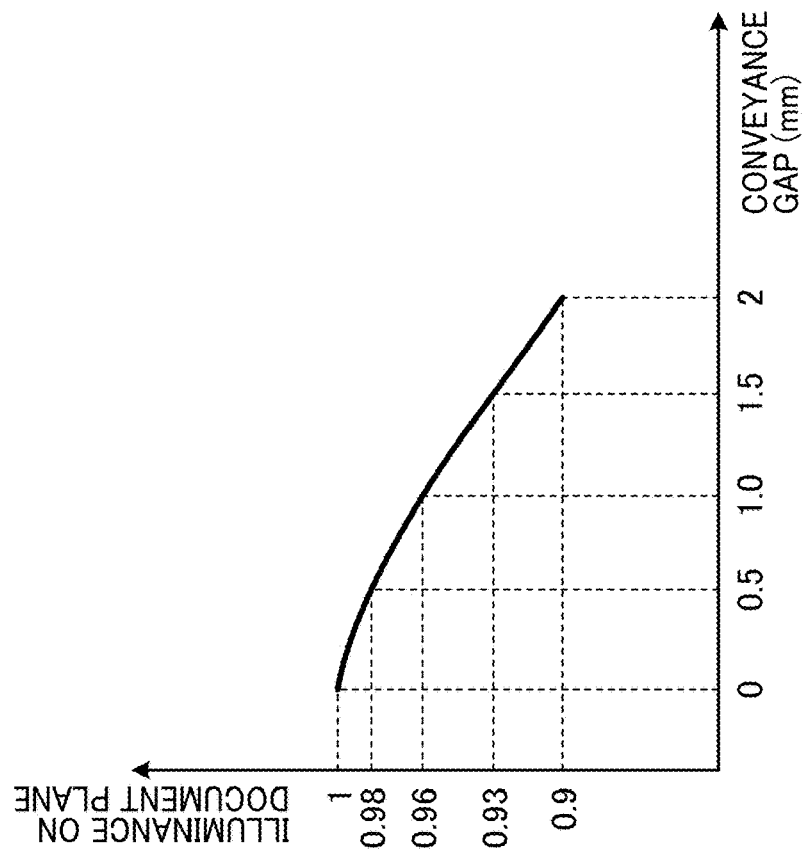

FIG. 25 to FIG. 27 are diagrams illustrating a configuration or structure according to the seventh modification of the above embodiments of the present disclosure. Such a configuration or structure according to the seventh modification of the above embodiments of the present disclosure is described below with reference to FIG. 26A, FIG. 26B, and FIG. 27 based on the conveyance pattern as illustrated in FIG. 25.

FIG. 26A is a diagram illustrating a configuration in which the illuminance on document plane decreases by 10% when the conveyance gap is 2 mm in a similar manner to FIG. 24, according to the seventh modification of the above embodiments of the present disclosure.

FIG. 26B illustrates the changes in scanning level corresponding to FIG. 26A.

When the light source 13 according to the above embodiments of the present disclosure is used and the same document is read at the position where the conveying gap is 0 mm (see the document pattern P1 in FIG. 25) and at the position where the conveying gap is 2 mm (see the document pattern P2 in FIG. 25), the scanning level in FIG. 26B is also reduced by 10% in a similar manner to the reduction in illuminance on document plane by 10% as illustrated in FIG. 26A.

In order to handle such a situation, in the present embodiment, the second detector 33 computes and obtains the decrease of 10% in scanning level to detect the decrease of 10% of the illuminance on document plane when the conveyance gap is 2 mm compared with the illuminance on document plane when the conveyance gap is 0 mm.

FIG. 27 is a diagram illustrating the relation between a change in scanning level and a change in reading depth caused by changes in illuminance on a document plane, according to the present embodiment.

As illustrated in FIG. 27, the scanning levels of a plurality of types of sheet (A, B, C, D, E, and so on) at the position of the conveyance gap 0 mm are acquired by the scanner 31 in advance and held by the second detector 33. When the type of sheet is read, the scanning level at the time of scanning is compared with the held scanning level to detect the changes in illuminance on the document plane. Further, the changes in reading depth at the scanning position is detected.

For example, as depicted in FIG. 27 in regard to the type of sheet A, when the scanning level at the conveyance gap 0 mm is 220 digits/8 bits as obtained in advance and the currently-obtained scanning level is 198 digits/8 bits, it is understood that the scanning level is reduced by 10%. Accordingly, it is understood that the illuminance on document plane is also reduced by 10%, and the conveyance gap of 2 mm at the scanning position can be detected from the relation illustrated in FIG. 26A and FIG. 26B.

As described above, the second detector 33 detects the changes in reading depth 2 mm, and the corrector 34 corrects the magnification of the visible image (first image) based on the relation illustrated in FIG. 9. In the present modification of the above embodiments of the present disclosure, the reading depth is away by 2 mm, and the size of the image is reduced by 0.25% compared with the reference position, i.e., the position of the contact glass. Accordingly, the corrector performs correction to increase the size of the image by 0.25%. Finally, a result of scanning after the correction is obtained.

In the above description of the first embodiment, the case where the MTF indicating the reading resolution is used as the amount of characteristic and the case where the changes in radiation intensity of light is used as the amount of characteristic are described separately. However, no limitation is indicated thereby, and both of these two amounts of characteristic may be detected at the same time. In such a configuration, the changes in reading depth are obtained for each of the detected amounts of characteristic, and the average of two sets of changes in reading depths is calculated. As a plurality of amounts of characteristics are detected in the above configuration, the accuracy of the detection of the changes in reading depth can further be improved.

Second Embodiment

The reading device that is applied to an image forming apparatus according to a second embodiment of the present disclosure is described below. In the present embodiment, an application to a production printer is described by way of example. Production printers are utilized as image forming apparatuses for commercial printing. The production printers typically include an inspection device therein, and such an inspection device is also used to inspect a print image printed onto a recording sheet such as a transfer sheet. Even in the inspection performed by the inspection device, the recording sheet may flap while being conveyed. For this reason, the accuracy of reading may decrease according to the changes in the reading depth of the inspection device, and the inspection results may be affected. In order to handle such a situation, the reading device is applied to the inspection device according to the present embodiment.

Also when the reading device is applied to the inspection device provided for the production printer, the reading device can be configured as above in a similar manner to the reading device in the first embodiment or any one of the multiple modifications of the above embodiments of the present disclosure. Accordingly, in the following description, overlapping description will be omitted, and portions that are different from the corresponding portions of the first embodiment will be described.

Figure 28:
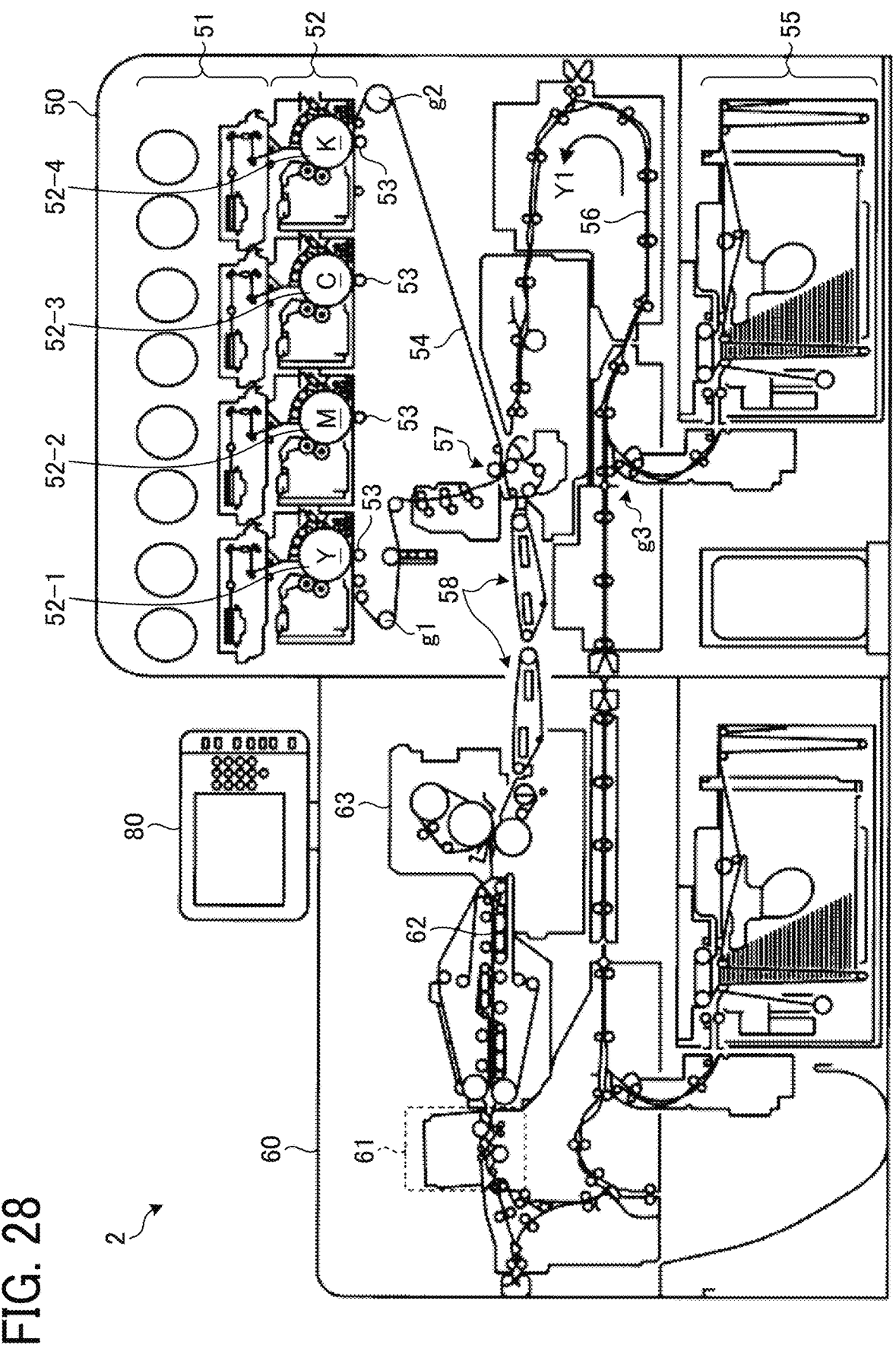
FIG. 28 is a diagram illustrating a configuration or structure of a production printer according to a second embodiment of the present disclosure.

FIG. 28 is a diagram illustrating a configuration or structure of a production printer 2 according to a second embodiment of the present disclosure.

The production printer 2 as illustrated in FIG. 28 includes an image forming housing 50 and an image fixing housing 60.

The image forming housing 50 is provided with an image forming device, and such an image forming device forms an image on a recording sheet and outputs the recording sheet.

The image fixing housing 60 includes an inspection device 61 to which the reading device is applied. The inspection device 61 scans a sheet output from the image forming housing 50, and detects a color tone or an image forming position of an image formed on the output sheet. Then, the detected color tone or image forming position are given to the image forming housing 50 as feedback.

More specifically, the production printer 2 includes the image forming housing 50, the image fixing housing 60, and an operation panel 80. The image forming housing 50 has an electrophotographic configuration as an image forming device.

The operation panel 80 is an operation unit that accepts, for example, various kinds of settings and operation inputs for the production printer 2.

The image forming housing 50 includes, for example, an optical writing device 51, a Y, M, C, and K image forming unit 52 of tandem system, a plurality of transfer devices 53, an intermediate transfer belt 54, a sheet feeder 55, a conveyance path 56, a secondary transfer roller 57, and a sheet ejection belt 58.

The image forming unit 52 includes four photoconductor drums 52-1, 52-2, 52-3, and 52-4 corresponding to four colors of Y, M, C, and K arranged in parallel, and image forming elements including a charger, a developing device, a transfer device, a cleaner, and a discharger are provided around each one of the photoconductor drums 52-1, 52-2, 52-3, and 52-4. An intermediate transfer belt 54 is disposed and nipped between the photoconductor drums 52-1, 52-2, 52-3, and 52-4 and the multiple transfer devices 53. The intermediate transfer belt 54 is stretched between a drive roller g1 and a driven roller g2.

The optical writing device 51 performs optical data writing on the multiple photoconductor drums 52-1, 52-2, 52-3, and 52-4. Each of the photoconductor drums 52-1, 52-2, 52-3, and 52-4 forms a toner image through an image forming process by an image forming element on a portion on which optical writing has been performed, and each of the transfer devices 53 superimposes toner images of four colors of Y, M, C, and K on top of one another in the order listed on the intermediate transfer belt 54 running in one direction. As a result, a full-color image is primarily transferred onto the intermediate transfer belt 54.

The intermediate transfer belt 54 further runs to convey the full-color image on the intermediate transfer belt 54 to a secondary transfer position.

The sheet feeder 55 accommodates a bundle of recording sheets, and feeds the recording sheets from an upper side of the bundle of recording sheets. A registration roller pair g3 separates the recording sheets fed from the sheet feeder 55 on a one-piece-by-one-piece basis and supplies the recording sheet to the conveyance path 56.

The conveyance path 56 conveys the recording sheet in the direction indicated by an arrow Y1.

The secondary transfer roller 57 transfers the full-color image conveyed by the intermediate transfer belt 54 onto the recording sheet conveyed through the conveyance path 56 at once at the secondary transfer position.

The image forming housing 50 sends the recording sheet on which the full-color image is transferred to the image fixing housing 60 by the sheet ejection belt 58.

The image fixing housing 60 includes, for example, an inspection device 61, a cooling unit 62, and a fixing unit 63. The recording sheet that is sent from the image forming housing 50 by the sheet ejection belt 58 is conveyed to the fixing unit 63, the cooling unit 62, and the inspection device 61 in the order listed, and processing is performed in each unit. The fixing unit 63 heats and pressurize the recording sheet in order to fix a full-color image on the recording sheet. The cooling unit 62 cools the heated recording sheet. The cooled recording sheet, i.e., the recording sheet on which a full-color image is fixed as described above, is conveyed and passes through the scanning position of the inspection device 61, and the inspection device 61 scans the recording sheet when the cooled recording sheet passes through the scanning position. A contact glass is provided as a scanning window at the scanning position, and light reflected from the recording sheet irradiated by a light source when passing through the contact glass is read by a line sensor.

For example, the configuration or structure such as the relative positions of the contact glass (scanning window) and the background-image member at the scanning position and an optical system that forms an image on a line sensor with the light emitted from the light source and reflected by a recording sheet correspond to the configuration as illustrated in FIG. 2. The configuration of the reading system and the correction unit of the inspection device 61 corresponds to the configuration of the reading system and the correction unit described as above in the first embodiment or the modifications of the above embodiments of the present disclosure. For example, the configuration of the reading system and the correction unit of the inspection device 61 corresponds to the configuration of the reading system and the correction unit as illustrated in FIG. 4 and described as above in the first embodiment of the present disclosure. Moreover, these configurations and how the recording sheet flaps at the scanning position are described as above in the first embodiment or the modifications of the above embodiments of the present disclosure.

A method of forming an image in the production printer 2 is described below. In the reading device according to the first embodiment of the present disclosure, the document on which the detection pattern is formed in advance is used. However, such formation of the detection pattern on the document may mean that an unwanted image is printed. For this reason, formation of the detection pattern may not be allowed.

For example, the production printer 2 finishes a sheet of A3 size with no margin. In order to achieve such a finish, in many cases, firstly, a recording sheet such as a sheet of SRA3 size larger than a sheet of A3 size may be used, and an image is formed on the entirety of A3 area. Then, the portion other than the A3 area are cut out before use. In such cases, the detection pattern is formed around the area in actual use, and the area including the detection pattern is cut out after the detection pattern is scanned. By so doing, the sheet can be used in a finish size. The area in actual use may be referred to as a finish-size area, and the area around such a finish-size area may be referred to as an area to be cut out.

Figure 29C:
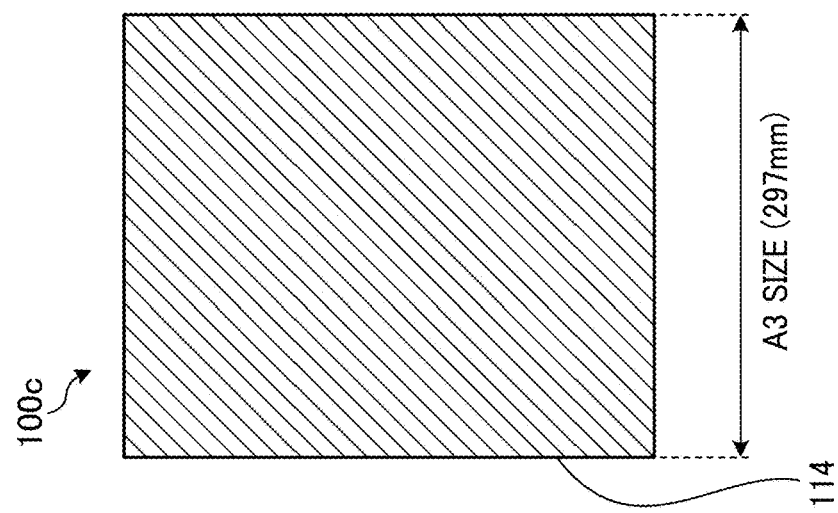
FIG. 29A, FIG. 29B, and FIG. 29C are diagrams each illustrating a configuration in which a detection pattern is formed in an area other than the area in area in actual use of a recording sheet, according to an embodiment of the present disclosure.
Figure 29B:
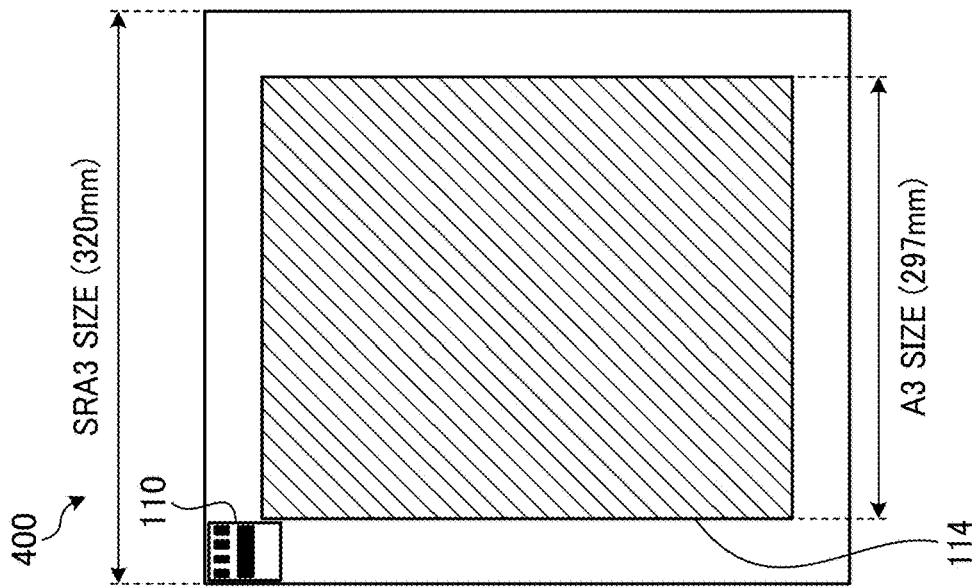
Figure 29A:
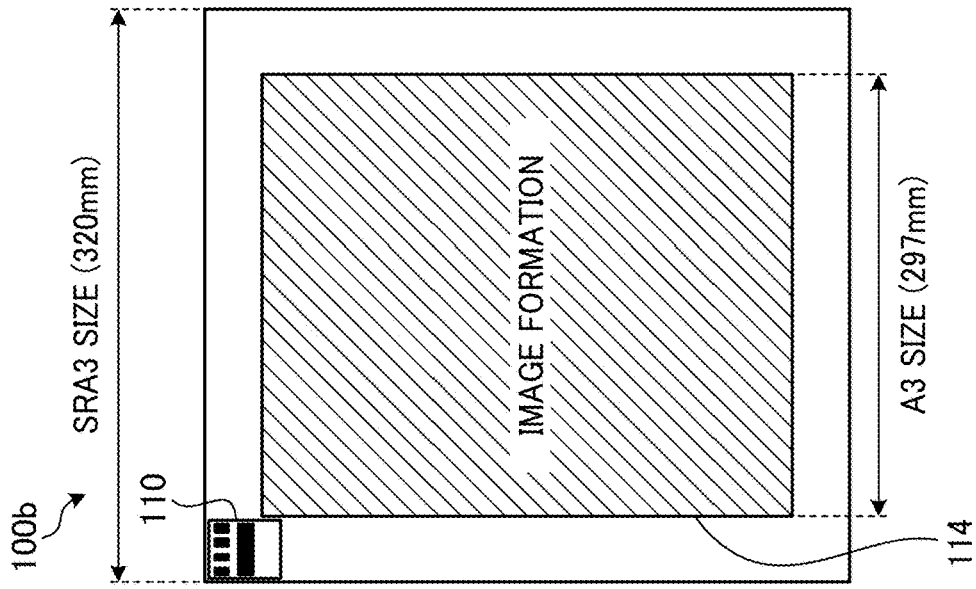

FIG. 29A, FIG. 29B, and FIG. 29C are diagrams illustrating cases in which the detection pattern 110 is formed in an area other than the area in area in actual use of the recording sheet, according to the second embodiment of the present disclosure.

The area in area in actual use corresponds to an actual image-forming area where an actual image is formed. FIG. 29A, FIG. 29B, and FIG. 29C illustrate cases in which an A3 area 114 is used as an area in area in actual use, according to the present embodiment. As illustrated in FIG. 29A, the detection pattern 110 is formed outside the A3 area 114 of the recording sheet 100b. In such a configuration, the reading device reads the second image 400 as illustrated in FIG. 29B, and detects the variations in the reading-depth direction from the detection pattern 110 outside the A3 area 114 in the second image 400. After that, as illustrated in FIG. 29C, a recording sheet 100c of A3 size is used as final product that is obtained by cutting out the area outside the A3 area 114.

As described above, the production printers tend to cut out the margin of the sheets before those sheets are used. In view of such circumstances, the detection pattern is formed in the margin portion, and the margin can be cut out later. Accordingly, the correction in the reading-depth direction can be performed without giving a side effect to the original image such as a document and a print image.

When the production printer 2 forms an image in the normal mode, the image is read by the inspection device 61, and the read result is output to the image forming housing 50. If the recording sheet flaps when the recording sheet is read by the inspection device 61, the result of scanning becomes different from the actual image. In order to handle such a situation, the result of scanning is corrected and then is output to the image forming housing 50.

The production printer 2 operates as each element is controlled by a control board.

The image forming housing 50 transmits an adjustment parameter used to calibrate the image forming housing 50 to a central processing unit (CPU) of the control board based on the result of scanning output from the inspection device 61. When the CPU receives the adjustment parameter, the CPU optimizes the image forming parameter of the image forming housing 50 and secures the image quality of the image formation.

The inspection device 61 can apply the above detection method to a correction method as follows. Such a correction method is described below with reference to FIG. 30 to FIG. 32.

Figure 30:
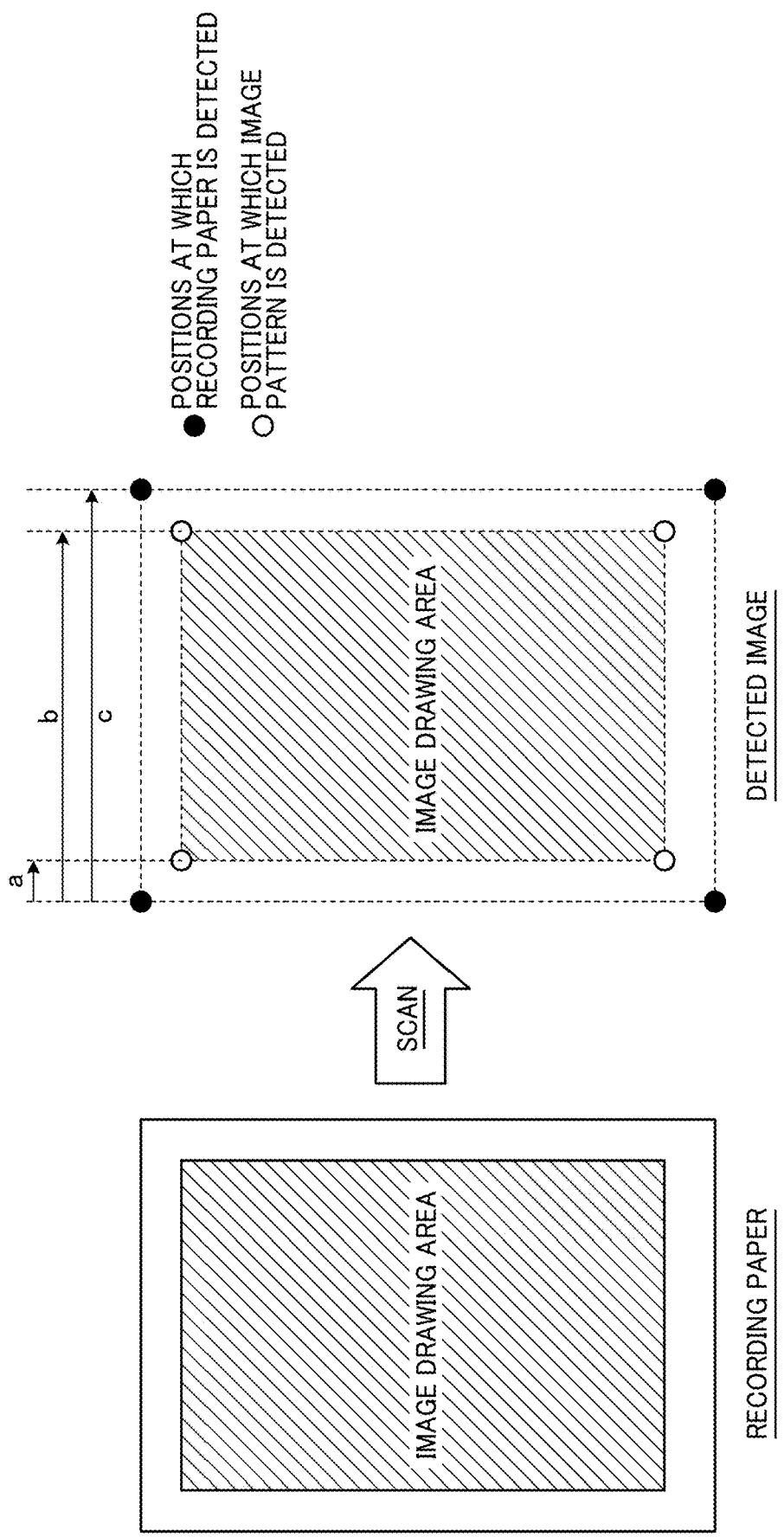
FIG. 30 is a diagram illustrating an object to be corrected according to an embodiment of the present disclosure.

FIG. 30 is a diagram illustrating an object to be corrected according to the present embodiment.

More specifically, FIG. 30 illustrates an external appearance and image writing area of a recording sheet as an object to be corrected, according to the present embodiment. The inspection device 61 according to the present embodiment uses a sensor to detect the position of a recording sheet as illustrated in FIG. 30, and estimates the external appearance of the recording sheet based on the result of detection. Note that the position of a recording sheet may be referred to as position information in the following description. More specifically, the coordinates of the four corners of the recording sheet are detected as illustrated in FIG. 30 to estimate the external appearance of the recording sheet.

The inspection device 61 also detects the position of the image pattern using a sensor. Such detection is achieved by detecting the coordinates of the four corners of the image in a similar manner to the detection of the external appearance of the recording sheet.

As described above, in the production printer 2, the inspection device 61 detects the external appearance of the recording sheet and the position of the image pattern, and corrects the printing position on the recording sheet by correcting the position information based on the change detected from the position of the image pattern.

When the reading device of reduction optical system is used, as illustrated in FIG. 9, an error occurs in the detection position of the recording sheet or the image pattern due to the influence of the magnification error. More specifically, an error occurs in the detection results of length a, length b, and length c in the main scanning direction as illustrated in FIG. 30. In order to avoid such a situation, the MTF is detected, and the amount of conveyance flapping of the recording sheet is calculated based on the relation between the MTF and the reading-depth direction (see FIG. 31). By so doing, the influence of the magnification error can be corrected.

Figure 31:
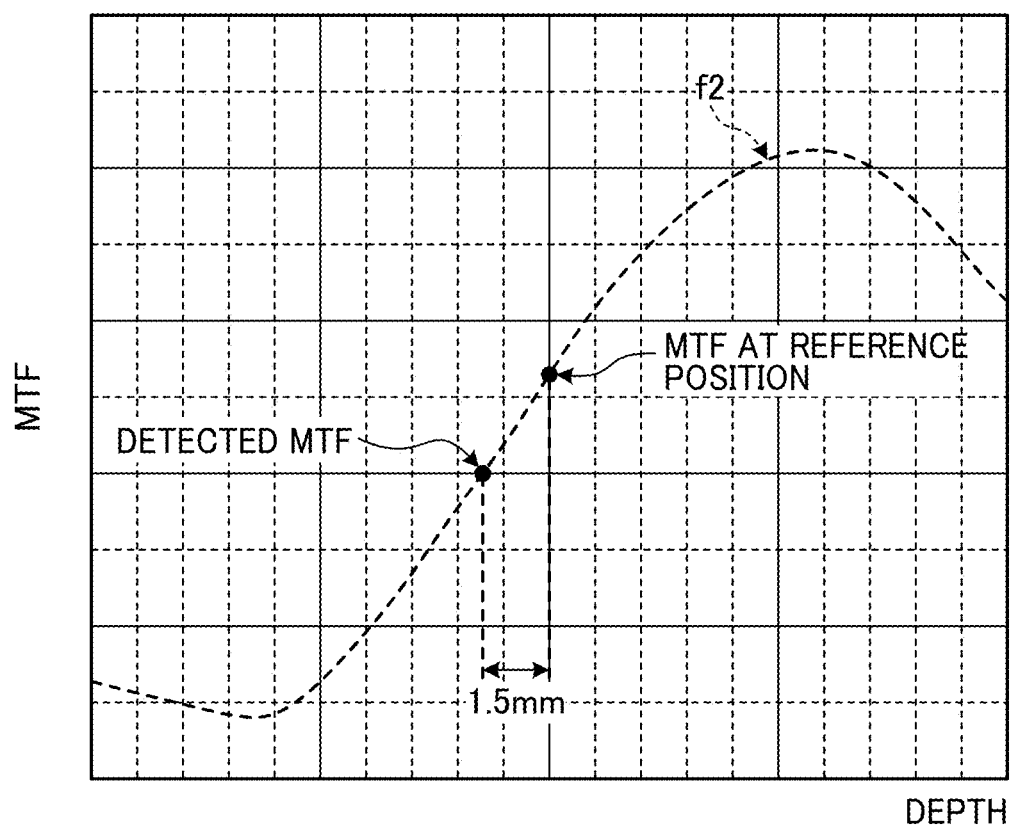
FIG. 31 is another diagram illustrating an object to be corrected according to an embodiment of the present disclosure.
Figure 32:
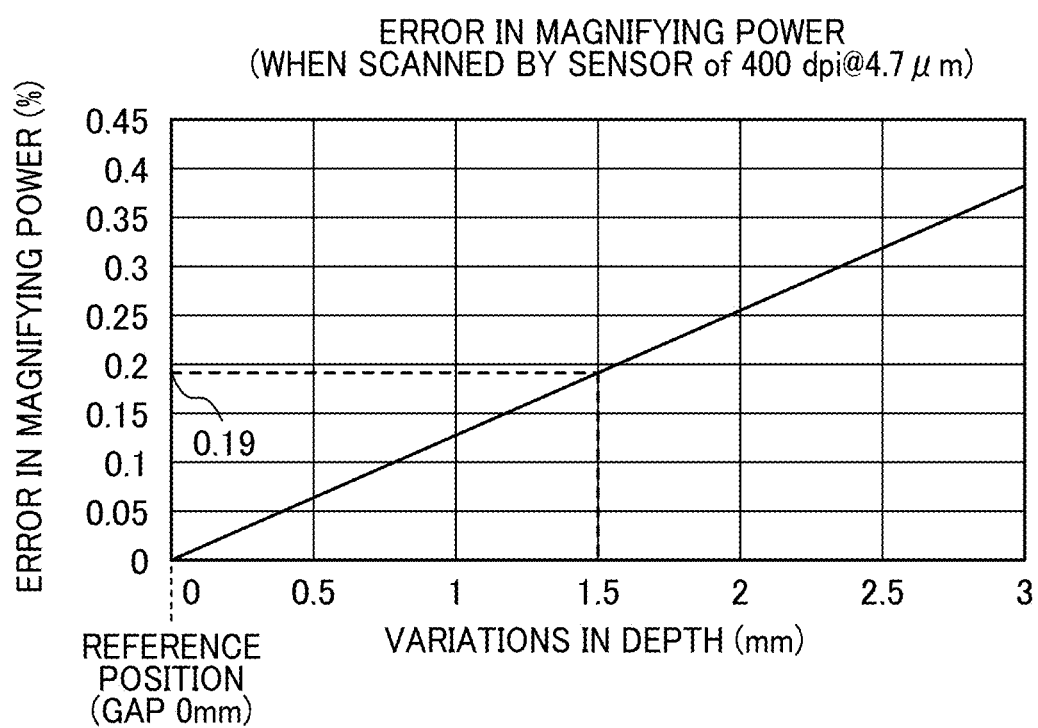
FIG. 32 is a graph illustrating an MTF detection method and an MTF correction method, according to an embodiment of the present disclosure.

FIG. 31 and FIG. 32 are diagrams illustrating a method of detecting and correcting the MTF, according to the present embodiment.

For example, it is assumed that the detection results of the length a, the length b, and the length c in FIG. 30 by the first detector 32 are 10 mm, 310 mm, and 320 mm, respectively. It is also assumed that the MTF when the detection pattern formed on the recording sheet is detected by the second detector 33 is a value at a position 1.5 mm away from the reference position illustrated in FIG. 31.

In such cases, as understood from the relation as illustrated in FIG. 32 that when the recording sheet passing through a position 1.5 mm away from the contact glass is read, the magnification is reduced by 0.19%. The corrector multiplies each of the detection results (length a, length b, and length c), which are read after being reduced by 0.19%, by 100/(100−0.19) for correcting the reduction. Accordingly, the corrected length a=10.02 mm, b=310.59 mm, and c=320.61 mm, which are the multiplication results, are set as results of the image position detection.

As described above, the deterioration of the accuracy of the image position detection that is caused by the changes in magnifying power due to the changes in reading depth can be prevented.

In the present embodiment, the MTF is used as the detection pattern. However, no limitation is indicated thereby, and the changes in reading depth may be detected from the changes in illuminance of illumination.

It is not always the case that the production printer 2 have a sufficient margin to be cut out in which the detection pattern can be formed. In such cases, the detection pattern may be formed on the recording sheet using a coloring material such as IR clear toner that is invisible under visible light. The detection pattern that is made of a coloring material invisible under visible light has already been described in the first embodiment of the present disclosure. For this reason, overlapping description in the description of the present embodiment is omitted.

Moreover, the multiple modifications of the first example embodiment of the present disclosure as described above may also be applied to the second embodiment where appropriate.

Moreover, in the second embodiment of the present disclosure, the reading device is applied to a production printer that is an example of an image forming apparatus. However, no limitation is intended thereby, and the reading device may be applied to different kinds of devices or apparatuses. Alternatively, the reading device according to the above embodiments of the present disclosure may be applied to, for example, a multifunction peripheral (MFP) that is an image forming apparatus that has at least two of a photocopying function, a printing function, a scanning function, and a facsimile (FAX) function.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, as described above, any one of the above-described and other methods of the present disclosure may be embodied in the form of a computer program stored on any kind of storage medium. Examples of storage media include, but are not limited to, flexible disks, hard disks, optical discs, magneto-optical discs, magnetic tape, nonvolatile memory cards, read only memory (ROM), etc. Alternatively, any one of the above-described and other methods of the present disclosure may be implemented by application-specific integrated circuits (ASICs), prepared by interconnecting an appropriate network of conventional component circuits, or by a combination thereof with one or more conventional general-purpose microprocessors and/or signal processors programmed accordingly.

What is claimed is:

1. A reading device comprising:
    a scanner configured to read an image in a first wavelength range and an image in a second wavelength range from light reflected by a surface of a recording medium;
    a detector configured to detect a change from a reference position in a reading-depth direction when the surface of the recording medium is read by the scanner, based on an amount of characteristic read from the image in the second wavelength range; and
    a corrector configured to correct the image in the first wavelength range based on the change detected by the detector.

2. The reading device according to claim 1, wherein, when the scanner reads the image in the second wavelength range, the amount of characteristic steadily changes in the reading-depth direction in a reading range in the reading-depth direction, and wherein, when the scanner reads the image in the first wavelength range, the amount of characteristic slightly changes in the reading-depth direction in the reading range in the reading-depth direction.

3. The reading device according to claim 1, wherein the amount of characteristic is a reading resolution of the scanner.

4. The reading device according to claim 1, wherein the surface of the recording medium has a detection pattern read in the second wavelength range on the surface of the recording medium, and wherein the detector is configured to detect the change from the reference position in the reading-depth direction, based on the amount of characteristic read from the detection pattern included in the image in the second wavelength range.

5. The reading device according to claim 4, wherein the detection pattern is present outside an actual image-forming area of the surface of the recording medium.

6. The reading device according to claim 4, wherein the detection pattern is formed on the surface of the recording medium with a coloring material undetectable under visible light.

7. The reading device according to claim 1, wherein the image in the second wavelength range includes a boundary of a region in which a change in density is large, and wherein the detector is configured to detect a change in a read value at the boundary of the region in which the change in density is large, and use the change detected in the read value at the boundary of the region as the amount of characteristic.

8. The reading device according to claim 1, wherein the detector is configured to use, as the amount of characteristic, a change in a read value at an edge of the recording medium in the image in the second wavelength range.

9. The reading device according to claim 1, wherein the scanner includes a light source used to read the image in the second wavelength range, and wherein the amount of characteristic is an amount of characteristic of a change in radiation intensity of light of the light source.

10. The reading device according to claim 1, wherein the scanner includes a light source used to read the image in the second wavelength range, and wherein the detector is configured to use both an amount of characteristic of a reading resolution of the scanner and an amount of characteristic of a change in radiation intensity of light of the light source, to detect the change from the reference position in the reading-depth direction.

11. The reading device according to claim 1,
wherein the corrector is configured to exclude the image from an object to be corrected when a read value has optical dependence on a location within a region in which collective correction is performed on the surface of the recording medium.

12. The reading device according to claim 1,
wherein the scanner is configured to detect position information of the surface of the recording medium as the image in the first wavelength range, and
wherein the corrector is configured to correct the position information based on the change detected by the detector.

13. An image forming apparatus comprising:
a reading device including
   a scanner configured to read an image in a first wavelength range and an image in a second wavelength range from light reflected by a surface of a recording medium,
   a detector configured to detect a change from a reference position in a reading-depth direction when the surface of the recording medium is read by the scanner, based on an amount of characteristic read from the image in the second wavelength range, and
   a corrector configured to correct the image in the first wavelength range based on the change detected by the detector; and
an image forming device configured to form an image corrected by the corrector of the reading device on a recording medium.

14. The image forming apparatus according to claim 13,
wherein the scanner of the reading device is configured to read the image formed by the image forming device.

15. A method of correction, the method comprising:
reading an image in a first wavelength range and an image in a second wavelength range from light reflected by a surface of a recording medium;
detecting a change from a reference position in a reading-depth direction when the surface of the recording medium is read by the reading, based on an amount of characteristic read from the image in the second wavelength range; and
correcting the image in the first wavelength range based on the change detected by the detecting.

* * * * *